(12) United States Patent
Chen et al.

(10) Patent No.: US 12,093,510 B2
(45) Date of Patent: Sep. 17, 2024

(54) METHOD, ELECTRONIC APPARATUS AND NON-TRANSITORY COMPUTER READABLE MEDIUM FOR MODIFYING PAGES OF ELECTRONIC DOCUMENT

(71) Applicant: KDAN MOBILE SOFTWARE LTD., Tainan (TW)

(72) Inventors: Yu-Wen Chen, Tainan (TW); Kai-Lin Shih, Tainan (TW)

(73) Assignee: KDAN MOBILE SOFTWARE LTD., Tainan (TW)

( * ) Notice: Subject to any disclaimer, the term of this patent is extended or adjusted under 35 U.S.C. 154(b) by 0 days.

(21) Appl. No.: 18/214,541

(22) Filed: Jun. 27, 2023

(65) Prior Publication Data
US 2024/0004526 A1 Jan. 4, 2024

Related U.S. Application Data

(60) Provisional application No. 63/356,639, filed on Jun. 29, 2022.

(30) Foreign Application Priority Data

Mar. 16, 2023 (TW) ................. 112109820

(51) Int. Cl.
G06F 3/0483 (2013.01)
G06F 3/04817 (2022.01)

(52) U.S. Cl.
CPC ........ G06F 3/0483 (2013.01); G06F 3/04817 (2013.01); G06F 2203/04806 (2013.01)

(58) Field of Classification Search
CPC ............... G06F 3/0483; G06F 3/04817; G06F 2203/04806
See application file for complete search history.

(56) References Cited

U.S. PATENT DOCUMENTS 7,689,933 B1 * 3/2010 Parsons ................... G06F 16/93
715/788
2011/0043844 A1 * 2/2011 Fukuoka ............ H04N 1/00225
358/1.13

(Continued)

OTHER PUBLICATIONS

Fabrice Matulic, Automatic Selection of Visually Attractive Pages for Thumbnails Display in Document List View, Nov. 1, 2008, Third International Conference on Digital Information Management, pp. 221-226 (Year: 2008).*

(Continued)

*Primary Examiner* — Tam T Tran
(74) *Attorney, Agent, or Firm* — WPAT, P.C

(57) ABSTRACT

The present disclosure provides a method and electronic apparatus for modifying pages of an electronic document, and the method is performed by the electronic apparatus and comprises the following steps: opening a first user operation interface; detecting whether a first input region is selected; when it is detected that the first input region is selected, displaying a plurality of first pages of a first electronic document on a page preview region and determining a first page change position located in the plurality of first pages according to a first operation event; detecting whether a second input region is selected; when it is detected that the second input region is selected, displaying a plurality of second pages of a second electronic document on the page preview region and determining at least one second page of the plurality of second pages according to a second operation event; and adding the at least one second page to the first page change position according to a third operation event.

20 Claims, 34 Drawing Sheets

(56) References Cited

U.S. PATENT DOCUMENTS

2011/0157636 A1* 6/2011 Maeda .................. G06F 3/0483
358/1.15
2012/0133980 A1* 5/2012 Harada ................ G06F 3/1285
358/1.15

OTHER PUBLICATIONS

Ryhan Ahmed Tamim et al., Automatic Document Feeding Scanner: A Low Cost Approach, Dec. 1, 2018, 21st International Conference of Computer and Information Technology, pp. 1-7 (Year: 2018).*

[Apple Emergency Room] Forget about Acrobat! Mac's built-in preview program allows you not only to edit PDFs but also notes and signatures!, Publication Data: Oct. 31, 2014, Website Link: https://tw.news.yahoo.com/news/%E8%98%8B%E6%9E%9C%E6%80%A5%E8%A8%BA%E5%AE%A4 %E5%88%A5%E7%AE%A1%E4%BB%80%E9%BA% BC acrobat %E4%BA%86 mac 105732771.html?guccounter=1.

Tips for inserting other PDF page into a PDF file. Let's collect them now!, Publication Data: Sep. 21, 2018, Website Link: http://blog.itpub.net/31547339/viewspace 2214652.

* cited by examiner

METHOD, ELECTRONIC APPARATUS AND NON-TRANSITORY COMPUTER READABLE MEDIUM FOR MODIFYING PAGES OF ELECTRONIC DOCUMENT

CROSS-REFERENCE TO RELATED APPLICATION

This application claims priority to and the benefit of Taiwan Patent Application Ser. No. 112109820, filed on Mar. 16, 2023, which claims priority to and the benefit of U.S. Provisional Patent Application Ser. No. 63/356,639, entitled "PDF Document Edit Method and Processing Apparatus", filed on Jun. 29, 2022, the entireties of which are incorporated by reference herein.

FIELD

The present disclosure relates generally to a method for editing an electronic document, and more particularly, to a method, an electronic apparatus and a non-transitory computer readable medium for modifying pages of an electronic document.

BACKGROUND

Nowadays, some document editing software provides page editing functions. Common page editing functions include a function of inserting one or more pages of one electronic document into another electronic document or a function of replacing at least one page of an electronic document with one or more pages of another electronic document. However, when the document editing software is used to insert discontinuous pages of one electronic document into different positions of another electronic document or to replace discontinuous pages of one electronic document with discontinuous pages of another electronic document respectively, a user has to first select the discontinuous pages of one electronic document through cumbersome steps and different user operation interfaces and then add the discontinuous pages to the other electronic document, which is time-consuming and inconvenient.

In order to solve the above problems, it is necessary to provide a method, an electronic apparatus and a non-transitory computer readable medium for easily and quickly modifying pages of an electronic document.

SUMMARY

Accordingly, the present disclosure provides a method for modifying pages of an electronic document, and the method is performed by an electronic apparatus and comprises the following steps: opening a first user operation interface, wherein the first user operation interface includes a first input region, a second input region and a page preview region; detecting whether the first input region is selected; when it is detected that the first input region is selected, displaying a plurality of first pages of a first electronic document on the page preview region and determining a first page change position located in the plurality of first pages according to a first operation event; detecting whether the second input region is selected; when it is detected that the second input region is selected, displaying a plurality of second pages of a second electronic document on the page preview region and determining at least one second page of the plurality of second pages according to a second operation event; and adding the at least one second page to the first page change position according to a third operation event.

In an embodiment of the present disclosure, the first user operation interface further includes a zoom control element, and the method further comprises: when it is detected that the first input region is selected, adjusting the size of the plurality of first pages on the page preview region according to a fourth operation event performed with respect to the zoom control element; and when it is detected that the second input region is selected, adjusting the size of the plurality of second pages on the page preview region according to a fifth operation event performed with respect to the zoom control element.

In an embodiment of the present disclosure, the method further comprises: when it is detected that the first input region is selected, switching the plurality of second pages of the second electronic document displayed on the page preview region to the plurality of first pages of the first electronic document; and when it is detected that the second input region is selected, switching the plurality of first pages of the first electronic document displayed on the page preview region to the plurality of second pages of the second electronic document.

In an embodiment of the present disclosure, the first page change position is at least one first position of at least one of the plurality of first pages in the first electronic document, and the step of adding the at least one second page to the first page change position is implemented by the following step: replacing the at least one of the plurality of first pages with the at least one second page, wherein the at least one first position is represented by at least one first page number corresponding to the at least one of the plurality of first pages.

In an embodiment of the present disclosure, the first page change position is a first position in front of or behind a first page of the plurality of first pages, and the step of adding the at least one second page to the first page change position is implemented by the following step: inserting the at least one second page to the first position in front of or behind the first page, wherein the first position is represented by a first page number corresponding to the first page of the plurality of first pages.

In an embodiment of the present disclosure, the first operation event is receiving from the first input region a first input associated with the first page change position, wherein the first input is associated with at least one first page number corresponding to the first page change position.

In an embodiment of the present disclosure, the step of determining the first page change position located in the plurality of first pages according to the first operation event further comprises: marking the first page change position located in the plurality of first pages of the first electronic document displayed on the page preview region according to the at least one first page number.

In an embodiment of the present disclosure, the method further comprises: displaying the at least one first page number on the first input region; selecting a second page change position located in the plurality of first pages of the first electronic document displayed on the page preview region according to a first selection event; and changing the at least one first page number displayed on the first input region to at least one second page number associated with the selected second page change position according to the selected second page change position, wherein the selection of the second page change position interacts with the first input.

In an embodiment of the present disclosure, the first selection event is a first click selection operation or a first frame selection operation performed with respect to the second page change position.

In an embodiment of the present disclosure, the second operation event is receiving from the second input region a second input associated with the at least one second page, wherein the second input includes at least one third page number corresponding to the at least one second page.

In an embodiment of the present disclosure, the step of determining the at least one second page of the plurality of second pages according to the second operation event further comprises: marking the at least one second page of the plurality of second pages of the second electronic document displayed on the page preview region according to the at least one third page number.

In an embodiment of the present disclosure, the method further comprises: displaying the at least one third page number on the second input region; selecting at least one third page of the plurality of second pages of the second electronic document displayed on the page preview region according to a second selection event; and changing the at least one third page number displayed on the second input region to at least one fourth page number corresponding to the at least one third page according to the at least one third page, wherein the selection of the at least one third page interacts with the second input.

In an embodiment of the present disclosure, the second selection event is at least one second click selection operation or a second frame selection operation performed with respect to at least one third page of the plurality of second pages.

In an embodiment of the present disclosure, the method further comprises: opening a second user operation interface; displaying the plurality of first pages of the first electronic document and a plurality of insertion icons on the second user operation interface, wherein each insertion icon is located between every two adjacent first pages of the plurality of first pages; and inserting at least one blank page to at least one position where at least one insertion icon of the plurality of insertion icons is located according to at least one click selection operation performed with respect to the at least one insertion icon.

The present disclosure further provides an electronic apparatus for modifying pages of an electronic document, and the electronic apparatus comprises a processor, a display and a storage. The display is electrically coupled to the processor. The storage is electrically coupled to the processor and configured to store at least one computer executable program. The at least one computer executable program, when executed by the processor, causes the processor to perform the following steps: opening a first user operation interface and displaying the first user operation interface on the display, wherein the first user operation interface includes a first input region, a second input region and a page preview region; detecting whether the first input region is selected; when it is detected that the first input region is selected, displaying a plurality of first pages of a first electronic document on the page preview region and determining a first page change position located in the plurality of first pages according to a first operation event; detecting whether the second input region is selected; when it is detected that the second input region is selected, displaying a plurality of second pages of a second electronic document on the page preview region and determining at least one second page of the plurality of second pages according to a second operation event; and adding the at least one second page to the first page change position according to a third operation event.

In an embodiment of the present disclosure, the electronic apparatus further includes at least one input device electrically coupled to the processor.

In an embodiment of the present disclosure, the first operation event is receiving from the first input region a first input associated with the first page change position, wherein the first input is input by the at least one input device.

In an embodiment of the present disclosure, the second operation event is receiving from the second input region a second input associated with the at least one second page, wherein the second input is input by the at least one input device.

In an embodiment of the present disclosure, the first user operation interface further includes a confirmation button, and the third operation event is a click selection operation performed by the at least one input device with respect to the confirmation button.

In an embodiment of the present disclosure, the page preview region further includes a first preview region for displaying the plurality of first pages of the first electronic document and a second preview region for displaying the plurality of second pages of the second electronic document, and the third operation event is a dragging operation detected by the at least one input device with respect to the at least one second page for dragging the at least one second page to the first page change position.

The present disclosure further provides a non-transitory computer readable medium storing a plurality of computer executable instructions. The plurality of computer executable instructions, when executed by one or more processors, cause an electronic apparatus to perform a method for modifying pages of an electronic document, and the method comprises the following steps: opening a first user operation interface, wherein the first user operation interface includes a first input region, a second input region and a page preview region; detecting whether the first input region is selected; when it is detected that the first input region is selected, displaying a plurality of first pages of a first electronic document on the page preview region and determining a first page change position located among the plurality of first pages according to a first operation event; detecting whether the second input region is selected; when it is detected that the second input region is selected, displaying a plurality of second pages of a second electronic document on the page preview region and determining at least one second page of the plurality of second pages according to a second operation event; and adding the at least one second page to the first page change position according to a third operation event.

BRIEF DESCRIPTION OF THE DRAWINGS

In order to make the above and other objects, features, advantages and embodiments of the present disclosure more readily understood, the accompanying drawings are described as follows.

DETAILED DESCRIPTION OF THE PREFERRED EMBODIMENTS

In the present disclosure, "a", "an" and "the" may refer to a singular form or a plural form, unless an article is specifically restricted to be a singular form in the context.

In addition, as used herein, the terms "comprise/comprising", "include/including", "have/having" and the like are open-ended terms that imply the inclusion of the disclosed features, elements and/or components, but do not preclude the presence or addition of one or more other features, elements, components, and/or groups thereof.

The term "coupled" used in the present disclosure may indicate that two or more elements or devices are in direct physical contact with each other or in indirect physical contact with each other, and may also indicate that two or more elements or devices cooperate or interact with each other.

Furthermore, the ordinal terms (such as "first", "second", "third" and the like) used in the present disclosure and claims are used to modify an element itself and do not imply any priority or any order of one element over another element, or do not imply a chronological order of steps of a method performed, but are used only as symbols to distinguish a claimed element having a particular name from another element having the same name.

The spirit of the present disclosure will be clearly illustrated with drawings and detailed descriptions below. After understanding the embodiments of the present disclosure, those skilled in the art with ordinary knowledge can make modifications and variations based on the technologies taught in the present disclosure without departing from the spirit and scope of the present disclosure.

Figure 1:
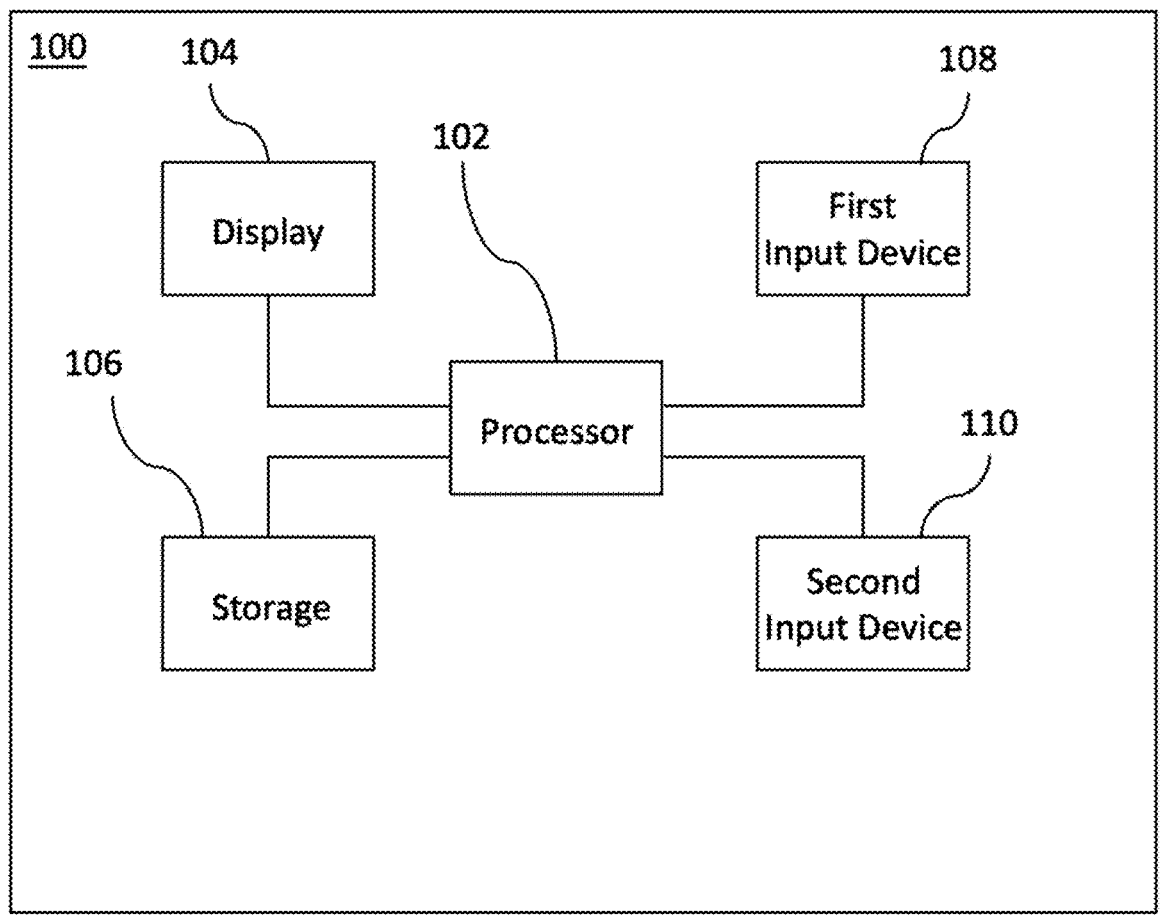
FIG. 1 is a block diagram of an electronic apparatus for modifying pages of an electronic document according to an embodiment of the present disclosure.

FIG. 1 is a block diagram of an electronic apparatus 100 for modifying pages of an electronic document according to an embodiment of the present disclosure. The electronic apparatus 100 includes a processor 102, a display 104, a storage 106, a first input device 108 and a second input device 110. The display 104, the storage 106, the first input device 108 and the second input device 110 are each electrically coupled to the processor 102. In the present embodiment, the first input device 108 and the second input device 110 can be implemented by, for example, a mouse, a touch screen or a keyboard, respectively.

Figure 2:
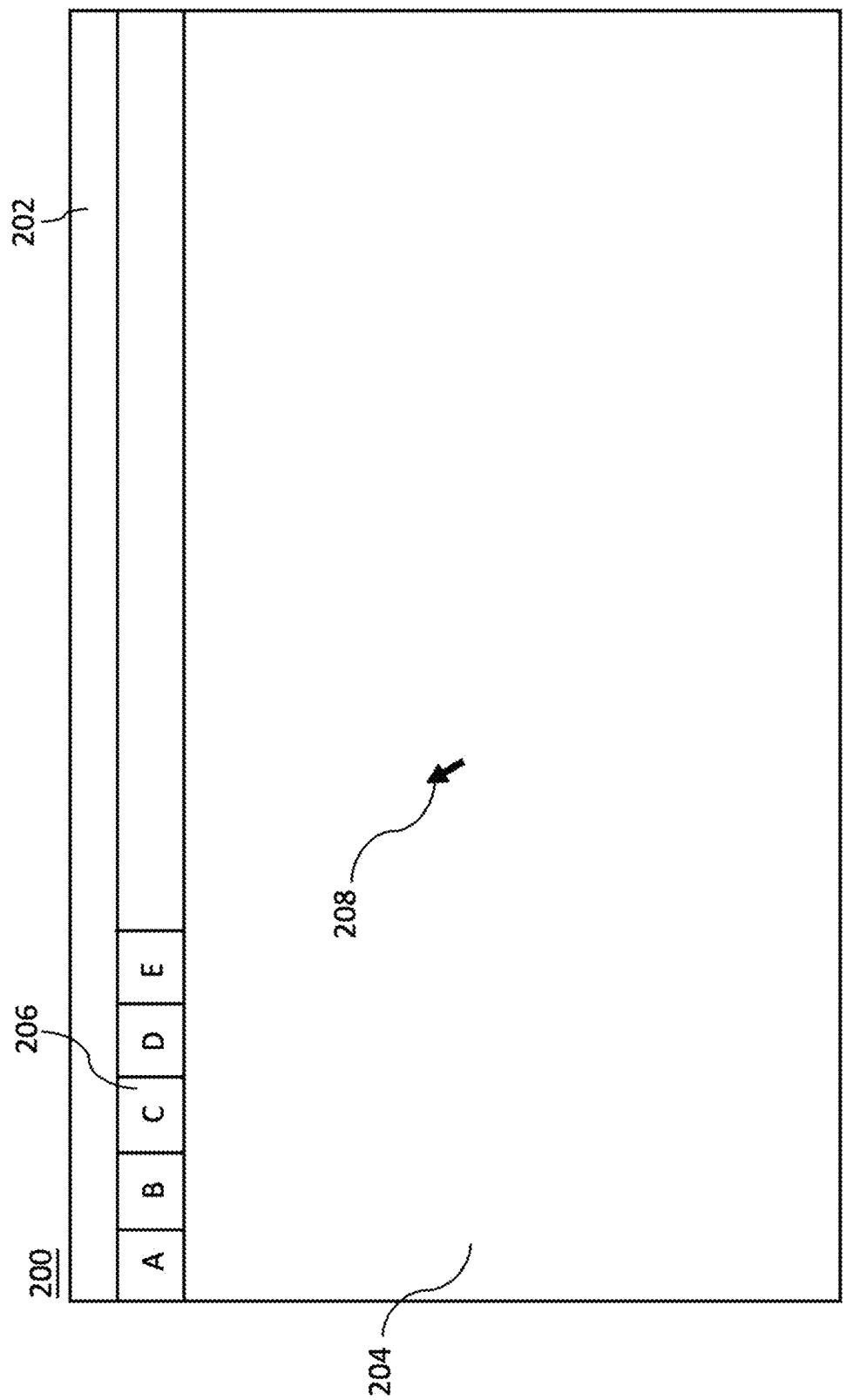
FIG. 2 is a schematic diagram of a document editing interface according to an embodiment of the present disclosure.

FIG. 2 is a schematic diagram of a document editing interface 200 according to an embodiment of the present disclosure. Referring now to FIG. 1 and FIG. 2, the display 104 is configured to display the document editing interface 200. In the present embodiment, the document editing interface 200 can be a document editing interface generated by the processor 102 executing a document editing software and includes at least a title region 202, a document editing region 204 and a function selection region 206. The title region 202 is used to display a file name of an electronic document. The document editing region 204 is used to display some pages or all pages contained in an electronic document. The function selection region 206 has at least five function options A, B, C, D and E, but is not limited thereto. In the present embodiment, that function option A may be an "open file" option, the function option B may be a "replace page" option, the function option C may be an "insert page" option, the function option D may be a "save file" option, and the function option E may be an "add blank page" option. In the present embodiment, the first input device 108 can be a mouse or a touch pad for controlling a cursor 208 displayed on the display 104 and performing an operation on the document editing interface 200. In addition, the second input device 110 can be a keyboard for inputting text and performing an operating on the document editing interface 200.

Figure 3A:
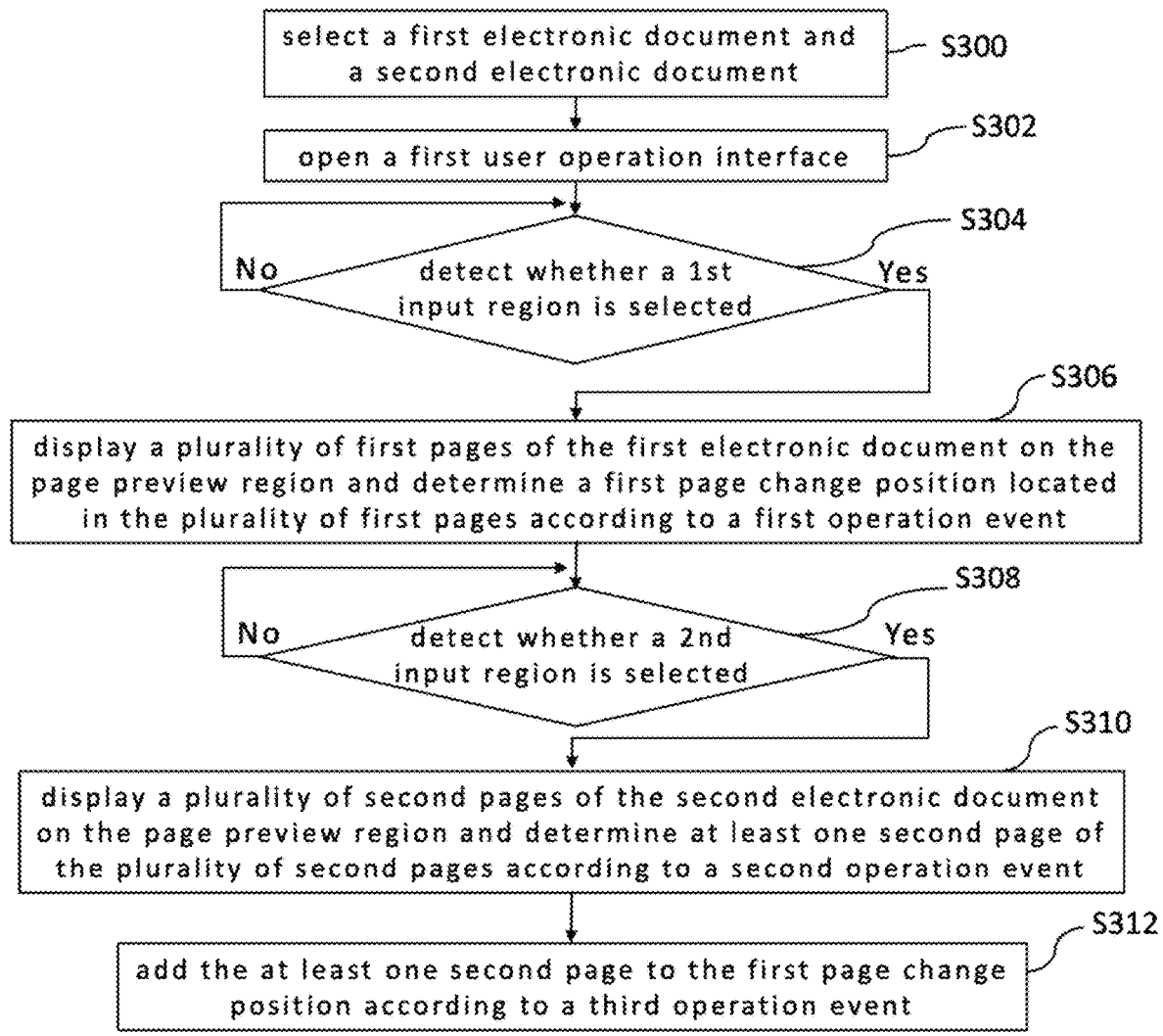
FIG. 3A to FIG. 3D are flowcharts illustrating a method for modifying pages of an electronic document according to an embodiment of the present disclosure.

FIG. 3A to FIG. 3D are flowcharts illustrating a method for modifying pages of an electronic document according to an embodiment of the present disclosure. In the present disclosure, the method for modifying pages of an electronic document will be described with a first embodiment and a second embodiment. FIG. 4A to FIG. 4P are schematic diagrams of a document editing interface 200 and a first user operation interface 300 in different operation states according to a first embodiment of the present disclosure for illustrating a method for modifying pages of an electronic document in the present embodiment. FIG. 6A to FIG. 6G are schematic diagrams of a document editing interface 200 and a second user operation interface 400 in different operation states according to a second embodiment of the present disclosure for illustrating a method for modifying pages of an electronic document in the present embodiment.

Referring now to FIG. 1, the storage 106 is configured to store a plurality of computer executable instructions, and the plurality of computer executable instructions, when executed by the processor 102, cause the electronic apparatus 100 to perform the steps of the method of the present embodiment for modifying pages of an electronic document. The method comprises steps S300 to S312 and will be described with reference to the first embodiment and the second embodiment.

In the first embodiment, the method for modifying pages of an electronic document is to replace two pages of a first electronic document 10 with two pages of a second electronic document 20, as shown in FIG. 4A to FIG. 4P.

Figure 4A:
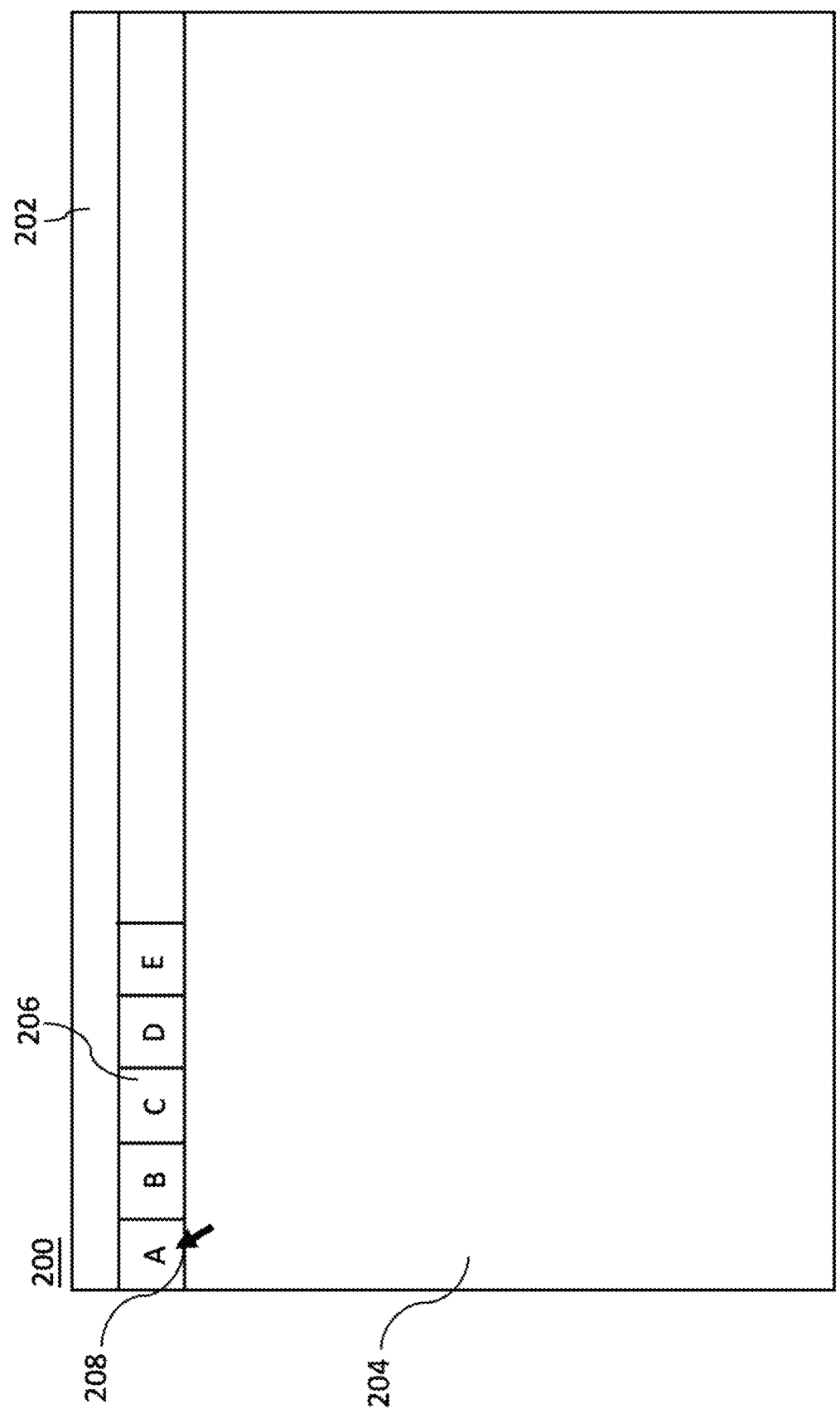
FIG. 4A to FIG. 4P are schematic diagrams of a document editing interface and a first user operation interface in different operation states according to a first embodiment of the present disclosure.
Figure 4B:
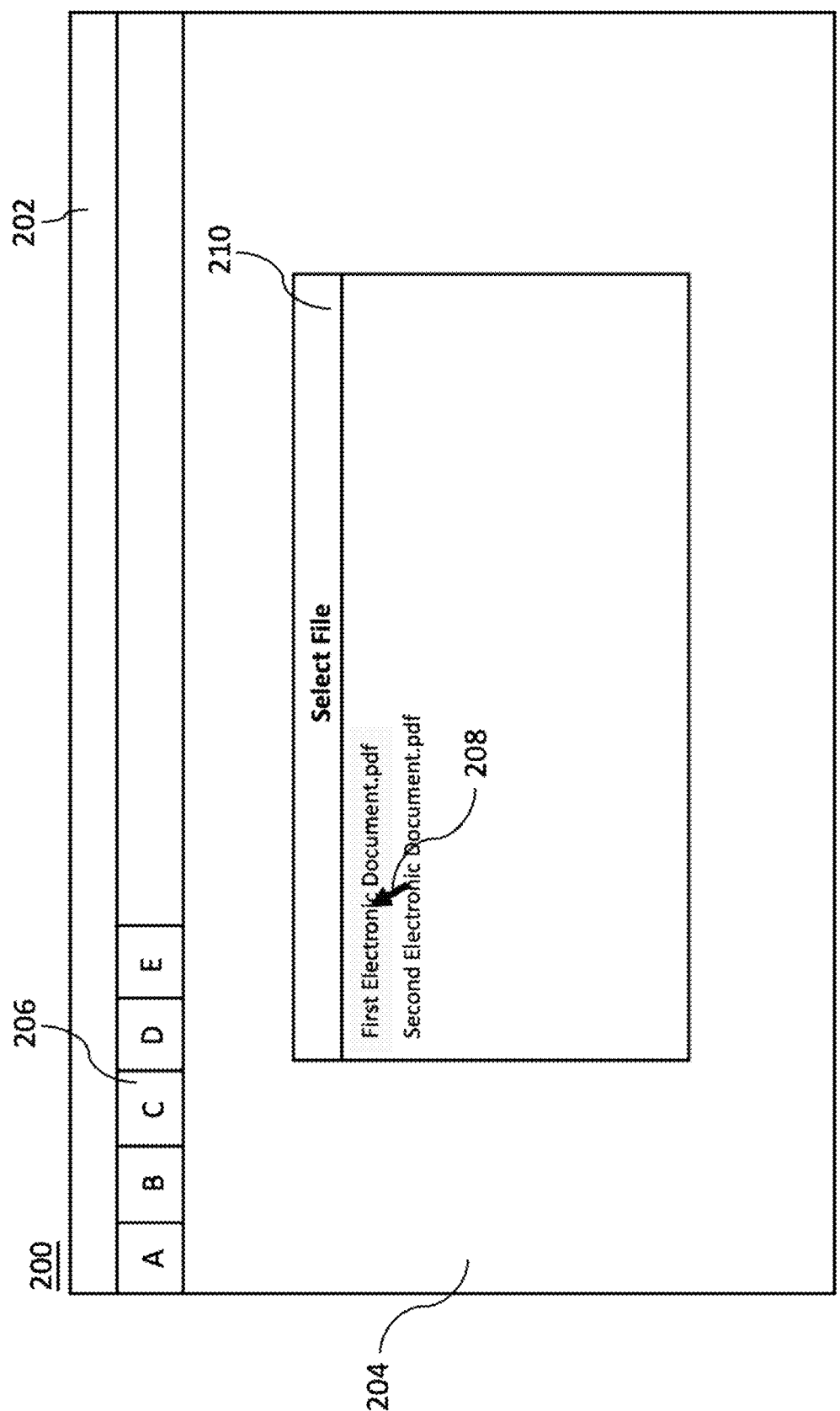
Figure 4C:
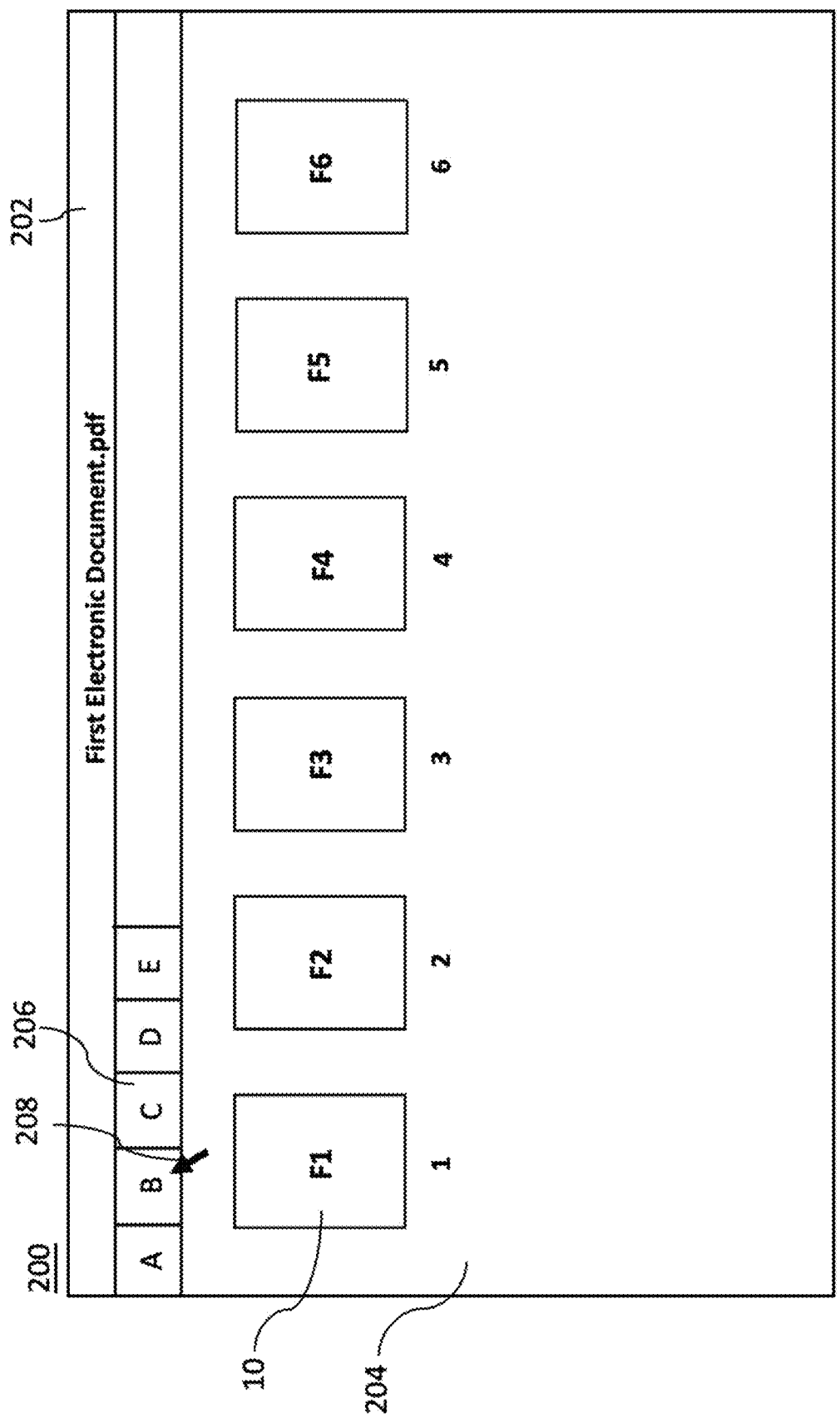
Figure 4D:
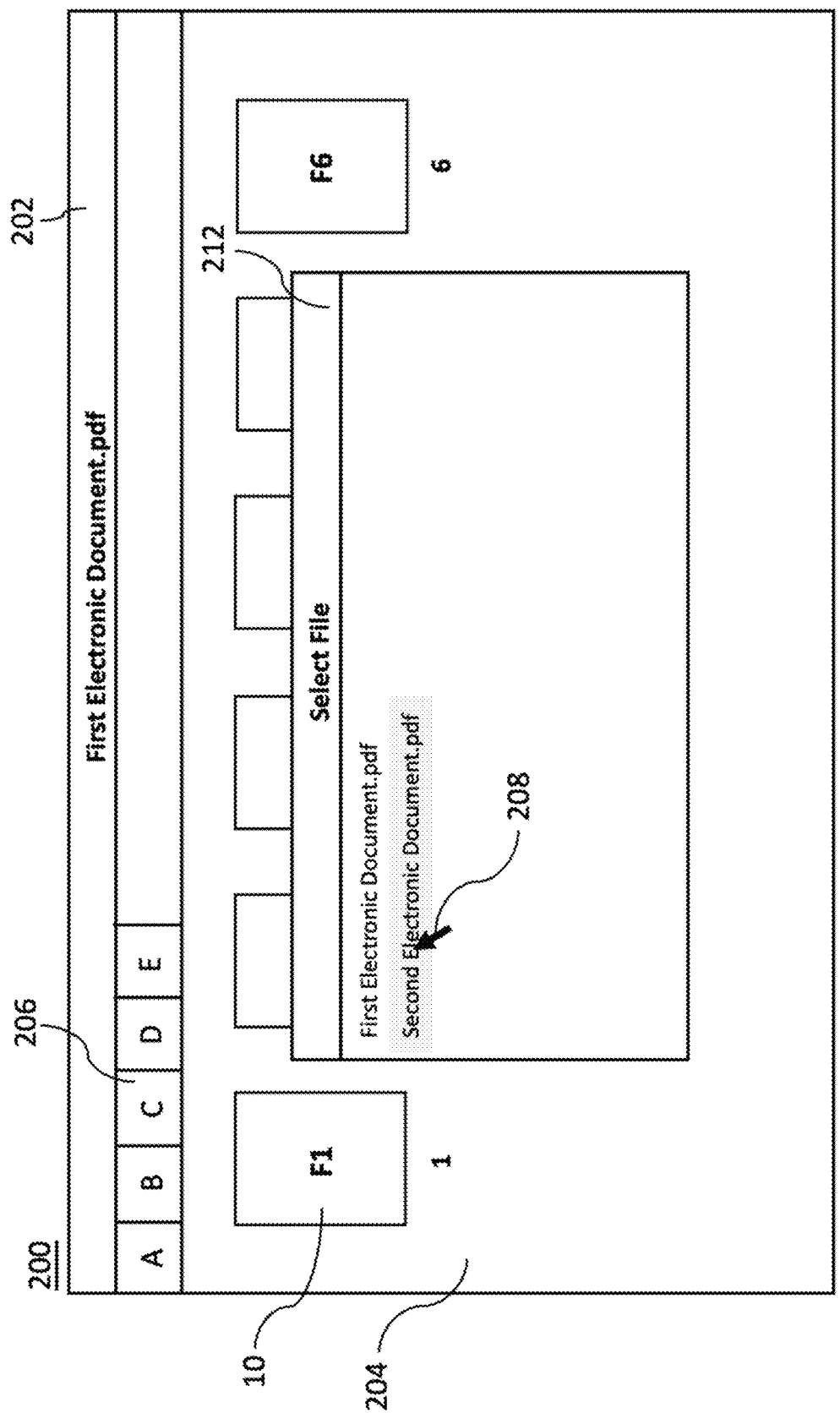

In step S300, the processor 102 can select the first electronic document 10 and the second electronic document 20 according to the control of the first input device 108 or the second input device 110. In the first embodiment, the step S300 will be described with reference to FIG. 4A to FIG. 4D. Referring now to FIG. 4A to FIG. 4C, the first input device 108 can control the cursor 208 and move the cursor 208 to the function option A (e. g., "open file" option) to perform a click selection operation to open a first window 210 for selecting the file of the first electronic document 10. In FIG. 4B, when the first window 210 is opened, the first input device 108 further controls the cursor 208 and moves the cursor 208 to the file (e.g., first electronic document.pdf) of the first electronic document 10 for performing a click selection operation, so as to open the first electronic document 10 in the document editing region 204 of the document editing interface 200, as shown in FIG. 4C. In the first embodiment, when the first electronic document 10 is opened, the file name of the first electronic document 10 is displayed on the title region 202. The first electronic document 10 includes six pages F1 to F6. The six pages F1 to F6 correspond to page numbers 1 to 6 respectively and are displayed on the document editing region 204. In the first embodiment, the page numbers 1 to 6 respectively corresponding to the six pages F1 to F6 can be numbered by the document editing software according to the order of the six pages F1 to F6 arranged in the first document 10. Next, as shown in FIG. 4C and FIG. 4D, the first input device 108 can control the cursor 208 and move the cursor 208 to the function option B (e. g., "replace page" option) to perform a click selection operation to open a second window 212 for selecting the file of the second electronic document 20. When the second window 212 is opened, the first input device 108 further controls the cursor 208 and moves the cursor 208 to the file (e.g., second electronic document.pdf) of the second electronic document 20 for performing a click selection operation, so as to select the second electronic document 20.

Figure 5:
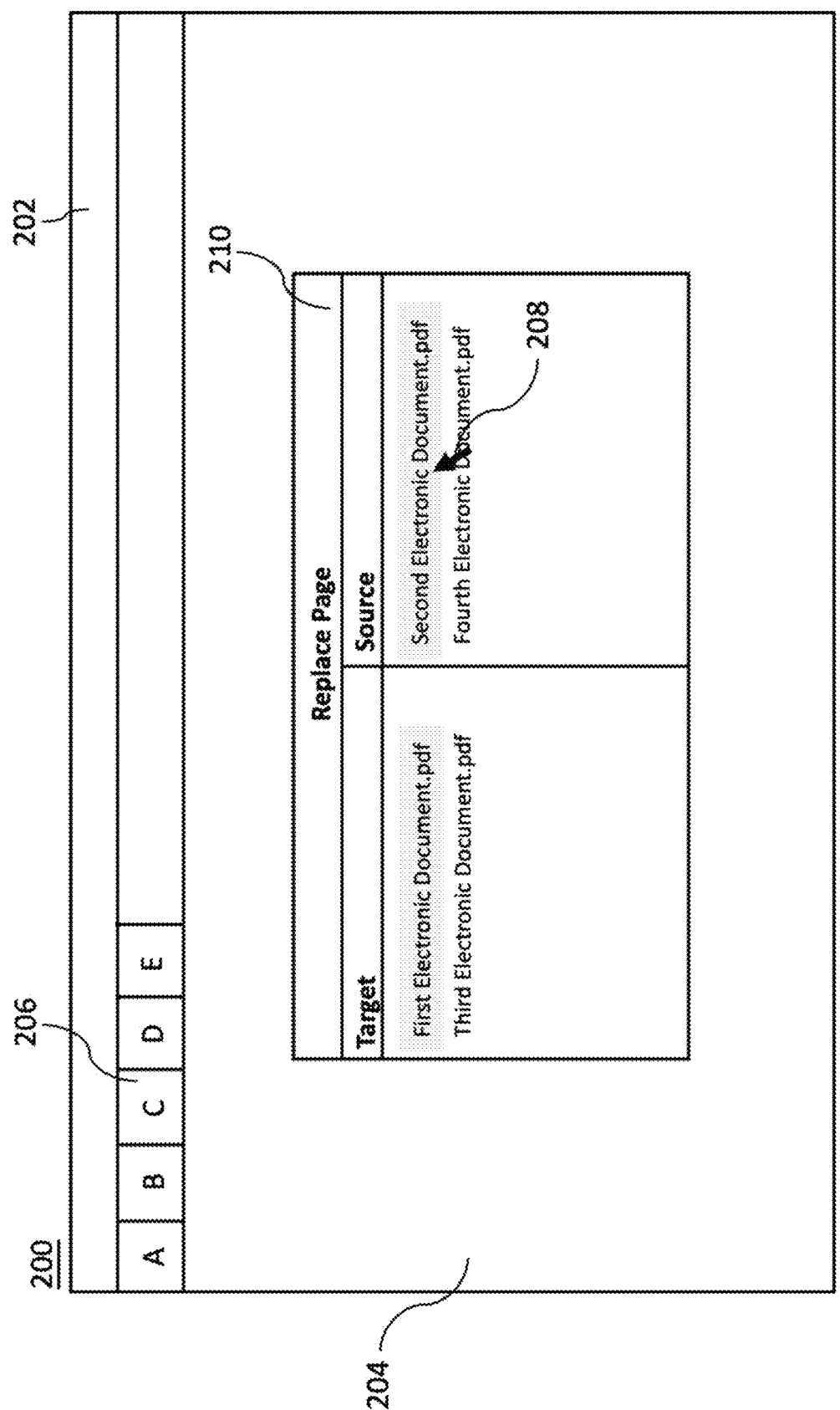
FIG. 5 is a schematic diagram of a document editing interface according to another embodiment of the present disclosure.

In the first embodiment, the first electronic document 10 and the second electronic document 20 are selected from the first window 210 and the second window 212, respectively, but not limited thereto. It should be understood that, in other embodiments, the step of selecting the function option A (e.g., "open file" option) can be omitted, and only the step of performing a click operation for the function option B (e.g., "replace page" option) may be performed to achieve a purpose of selecting the file of the first electronic document 10 and the file of the second electronic document 20 in the same window 210, as shown in FIG. 5.

Figure 4E:
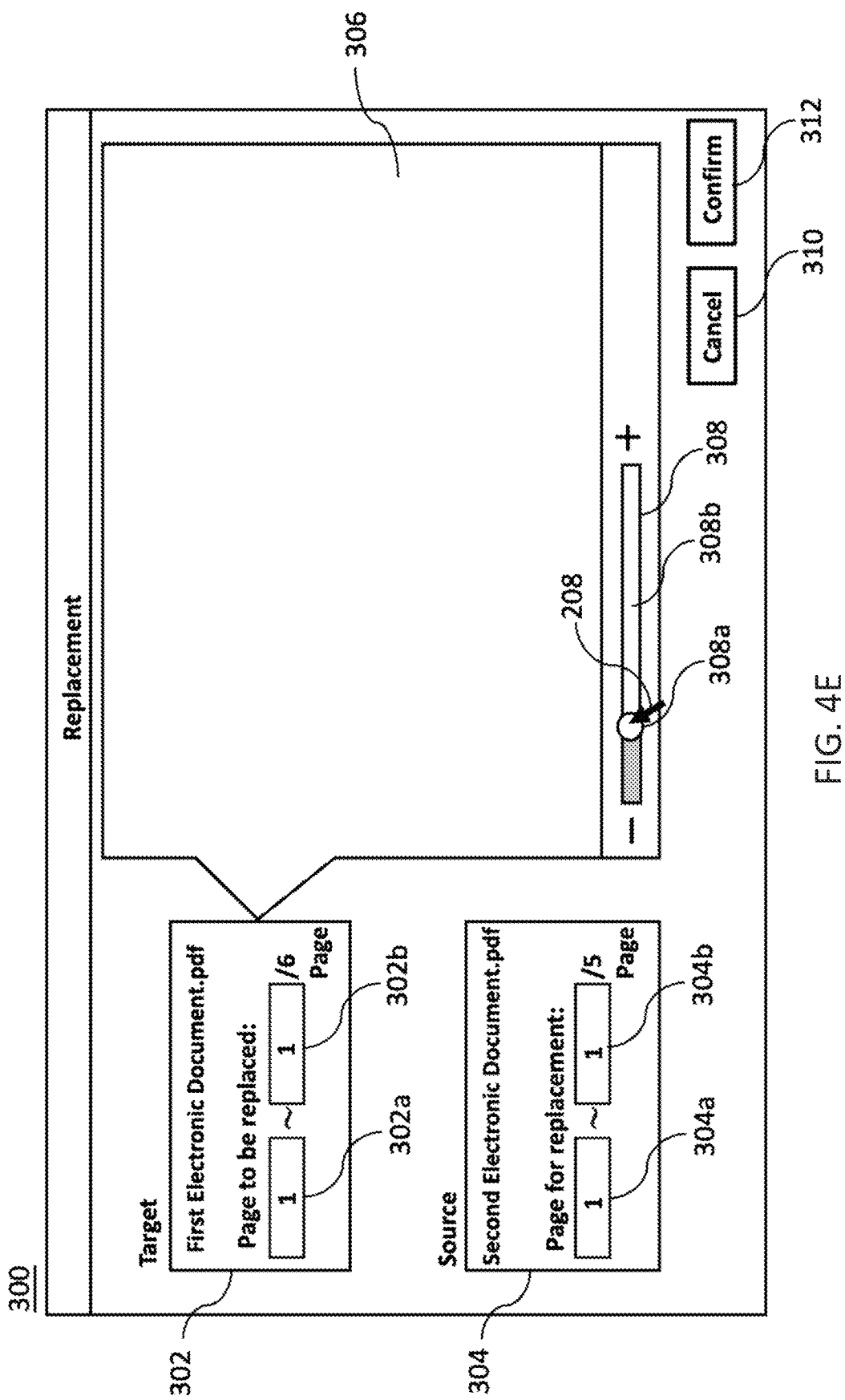

In step S302, after the first electronic document 10 and the second electronic document 20 are selected, the processor 102 will open a first user operation interface 300, as shown in FIG. 4E. The first user operation interface 300 includes a first input region 302, a second input region 304, a page preview region 306, a zoom control element 308, a cancel button 310 and a confirmation button 312. The first input region 302 is associated with the first electronic document 10 and has two input fields 302a, 302b for inputting a page number of a page to be replaced and/or a page range of pages to be replaced in the first electronic document 10. The second input region 304 is associated with the second electronic document 20 and has two input fields 304a, 304b for inputting a page number of a page to be used for replacement and/or a page range of pages to be used for replacement in the second electronic document 20. In the first embodiment, the page preview region 306 can selectively present the pages of the first electronic document 10 or the pages of the second electronic document 20. In other embodiments, the page preview region 306 can simultaneously present the pages of the first electronic document 10 and the pages of the second electronic document 20 at the same time. The zoom control element 308 includes a slide button 308a and a slide track 308b. The slide button 308a can be moved toward the "+" icon or toward the "−" icon along the slide track 308b by a dragging operation performed by the cursor 208 controlled by the first input device 108 to adjust the size of the pages displayed on the page preview region 306. The cancel button 310 is used to cancel a page replacing operation between two electronic documents and close the first user operation interface 300. The confirmation button 312 is used to confirm a page replacing operation between two electronic documents and close the first user operation interface 300.

Figure 4F:
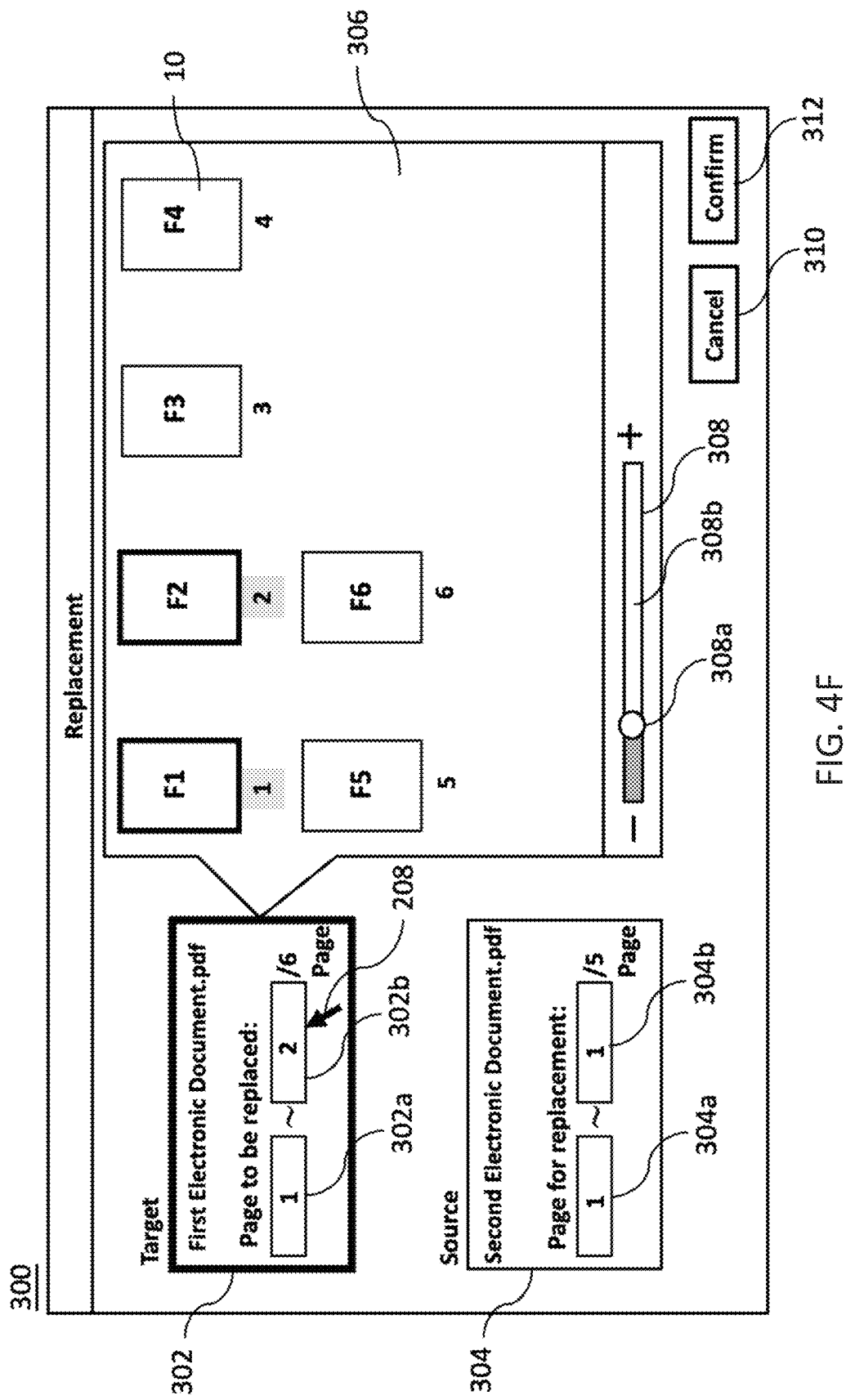

In step S304, the processor 102 will detect whether the first input region 302 is selected. In the first embodiment, the processor 102 will detect whether the first input region 302 is clicked and selected by the cursor 208 controlled by the first input device 108, as shown in FIG. 4F. When the processor 102 detects that the first input region 302 is selected, proceed to step S306. Otherwise, proceed to step S304.

In step S306, when the processor 102 detects that the first input region 302 is selected, the processor 102 will drive the display 104 to display a plurality of first pages of the first electronic document 10 on the page preview region 306 and determine a first page change position located in the plurality of first pages according to a first operation event, as shown in FIG. 4F. In the first embodiment, the plurality of first pages are six pages F1 to F6, and the first page change position is the positions where the page F1 and the page F2 (i. e., the pages to be replaced) are located in the first electronic document 10 and represented by page numbers corresponding to the page F1 and the page F2. In other embodiments, the first page change position may be one position or more than two positions where one page or more than two pages are located in the first electronic document 10. In the first embodiment, when the processor 102 detects that the first input region 302 is clicked and selected by the cursor 208 controlled by the first input device 108, the selected first input region 302 can be marked (e.g., highlighted) to indicate that it has been selected, and the processor 102 will drive the display 104 to display the six pages F1 to F6 of the first electronic document 10 on the page preview region 306. In addition, when the processor 102 detects that the first input region 302 is clicked and selected by the cursor 208, the processor 102 will determine the page F1 and the page F2 (i.e., the pages to be replaced) of the six pages F1 to F6 according to a first operation event. In the first embodiment, the first operation event can be receiving from the two input fields 302a, 302b of the first input region 302 a first input that is inputted by the second input device 110 (e.g., a keyboard) and associated with the first page change position, wherein the first input is associated with at least one page number corresponding to the first page change position. In the present embodiment, the first page change position located in the first electronic document 10 is the page F1 (i.e., the first page) and the page F2 (i.e., the second page), so the at least one page number corresponding to the first page change position and being associated with the first input is 1 and 2. Further, the step of determining the first page change position located in the plurality of first pages according to the first operation event further comprises: marking the two pages F1, F2 corresponding to the two page numbers (i.e., 1 and 2) among the six pages F1 to F6 of the first electronic document 10 displayed on the page preview region 306 according to the two page numbers (i.e., 1 and 2). In other words, when the first input is received by the two input fields 302a, 302b, the two pages F1, F2 corresponding to the two page numbers (i.e., 1 and 2) can be marked (e.g., highlighted) on the page preview region 306 to indicate that the two pages F1, F2 have been selected and determined. In another embodiment, when the page to be replaced in the first electronic document 10 is only one page, the first input received by the two input fields 302a, 302b is two identical page numbers. For example, when the page to be replaced in the first electronic document 10 is only the page F2, the first input received by the two input fields 302a, 302b is 2 and 2, respectively.

Figure 4G:
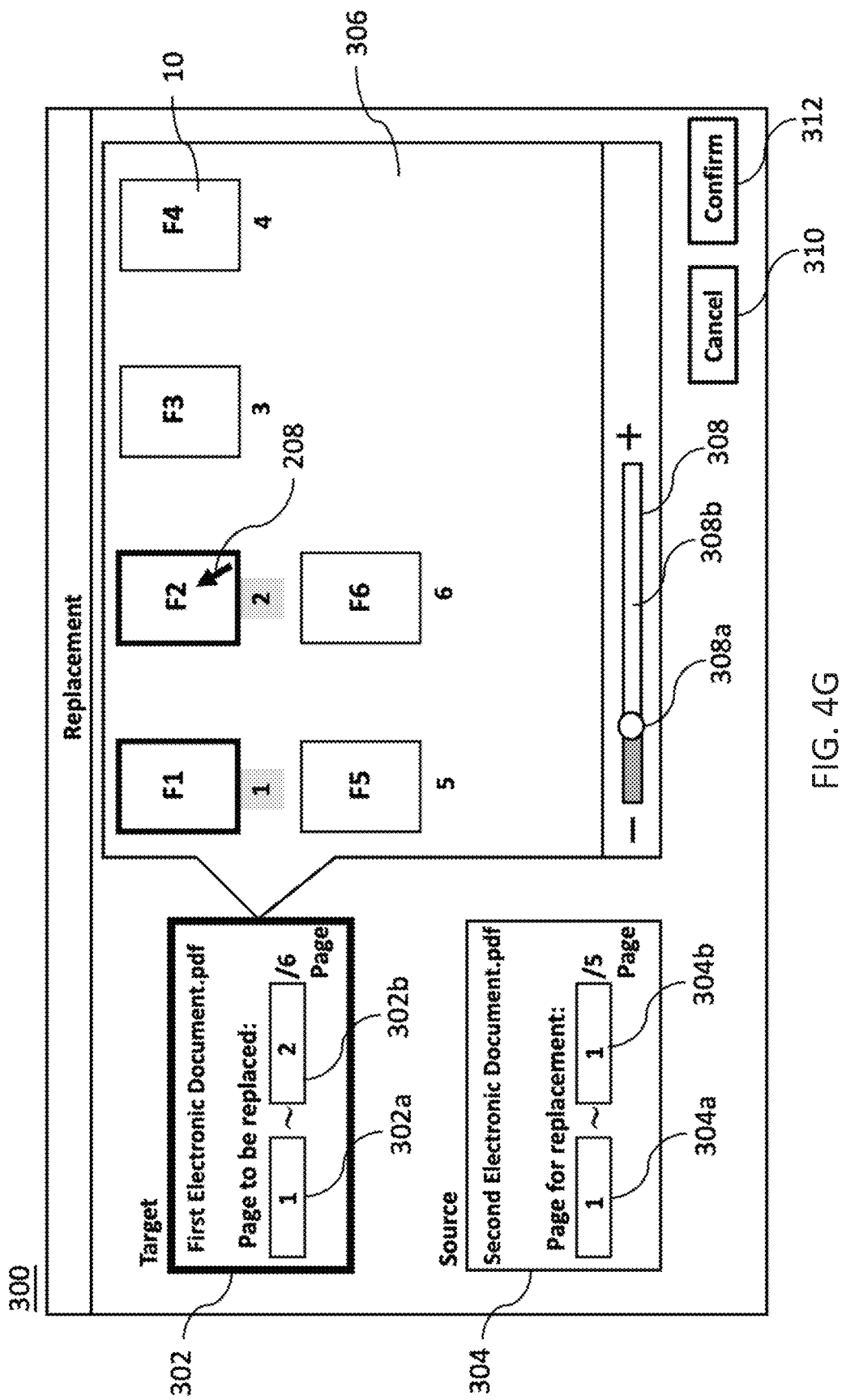
Figure 4H:
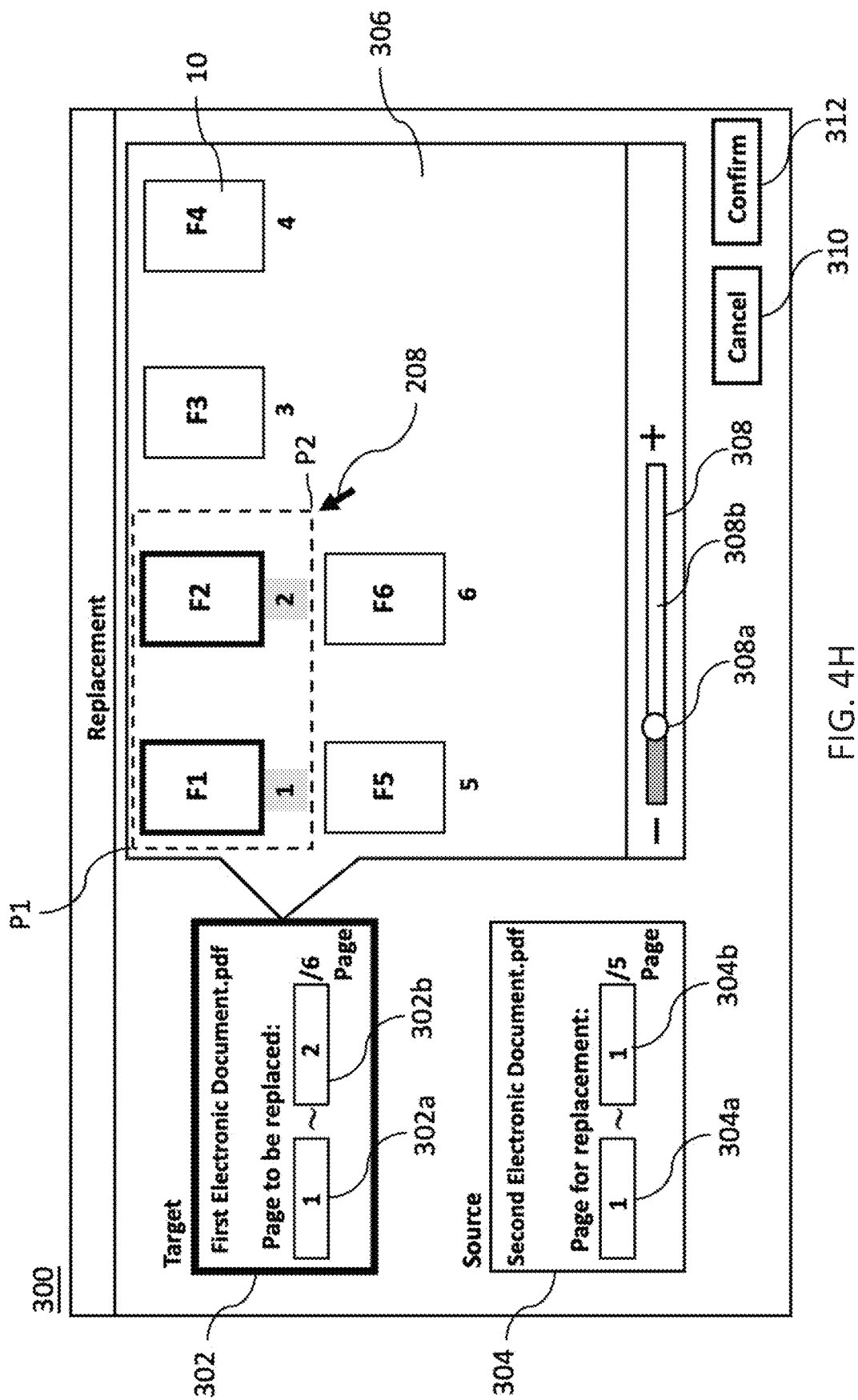

In the first embodiment, the first operation event may also be at least one click selection operation or a frame selection operation performed by the cursor 208 controlled by the first input device 108 with respect to the page to be replaced (e.g., page F1 and page F2), as shown in FIG. 4G and FIG. 4H.

Referring now to FIG. 4G, the cursor 208 controlled by the first input device 108 can perform a click selection operation with respect to the page F1 and another click selection operation with respect to the page F2, respectively, so as to mark (e.g., highlight) the page F1 and the page F2 respectively, thereby selecting and determining the page F1 and the page F2 as the first page change position. In the present embodiment, when the page F1 and the page F2 are clicked and selected by the cursor 208, the two input fields 302a, 302b will automatically present two page numbers (i.e., 1 and 2) corresponding to the page F1 and the page F2.

Referring now to FIG. 4H, the cursor 208 controlled by the first input device 108 can perform a frame selection operation with respect to the page F1 and the page F2 by dragging from a point P1 to a point P2 so as to mark (e.g., highlight) the page F1 and the page F2, thereby selecting and determining the page F1 and the page F2 as the first page change position. In the present embodiment, when the page F1 and the page F2 are framed and selected by the cursor 208, the two input fields 302a, 302b will automatically present two page numbers (i.e., 1 and 2) corresponding to the page F1 and the page F2.

In addition, in the first embodiment, the first page change position may alternatively be selected and determined either by a first input inputted to the two input fields 302a, 302b of the first input region 302 or by at least one click selection operation or a frame selection operation performed by the cursor 208 with respect to at least one page of the first electronic document 10 on the page preview region 306. In another embodiment, after the first page change position is selected and determined by a first input inputted to the two input fields 302a, 302b of the first input region 302, the first page change position can be further changed to a second page change position by at least one click selection operation or a frame selection operation performed by the cursor 208 with respect to at least one page of the first electronic document 10 on the page preview region 306. Hereinafter, a frame selection operation is taken as an example and described with reference to FIG. 3B, FIG. 4F and FIG. 4I. On the contrary, after the first page change position is selected and determined by at least one click selection operation or a frame selection operation performed by the cursor 208 with respect to at least one page of the first electronic document 10 on the page preview region 306, the first page change position can be further changed to a second page change position by a first input inputted to the two input fields 302a, 302b of the first input region 302.

Figure 3B:
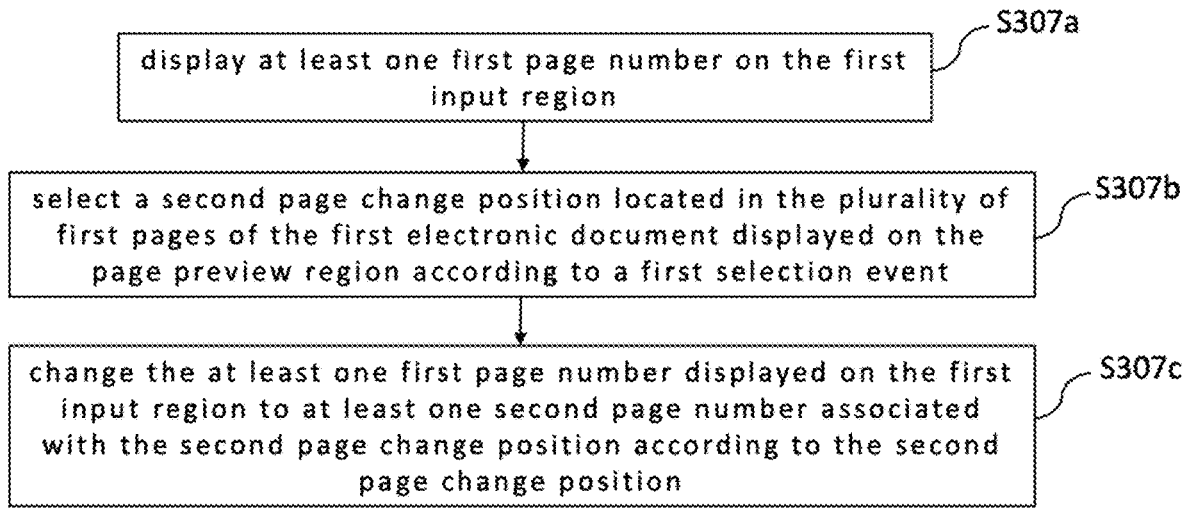
Figure 4I:
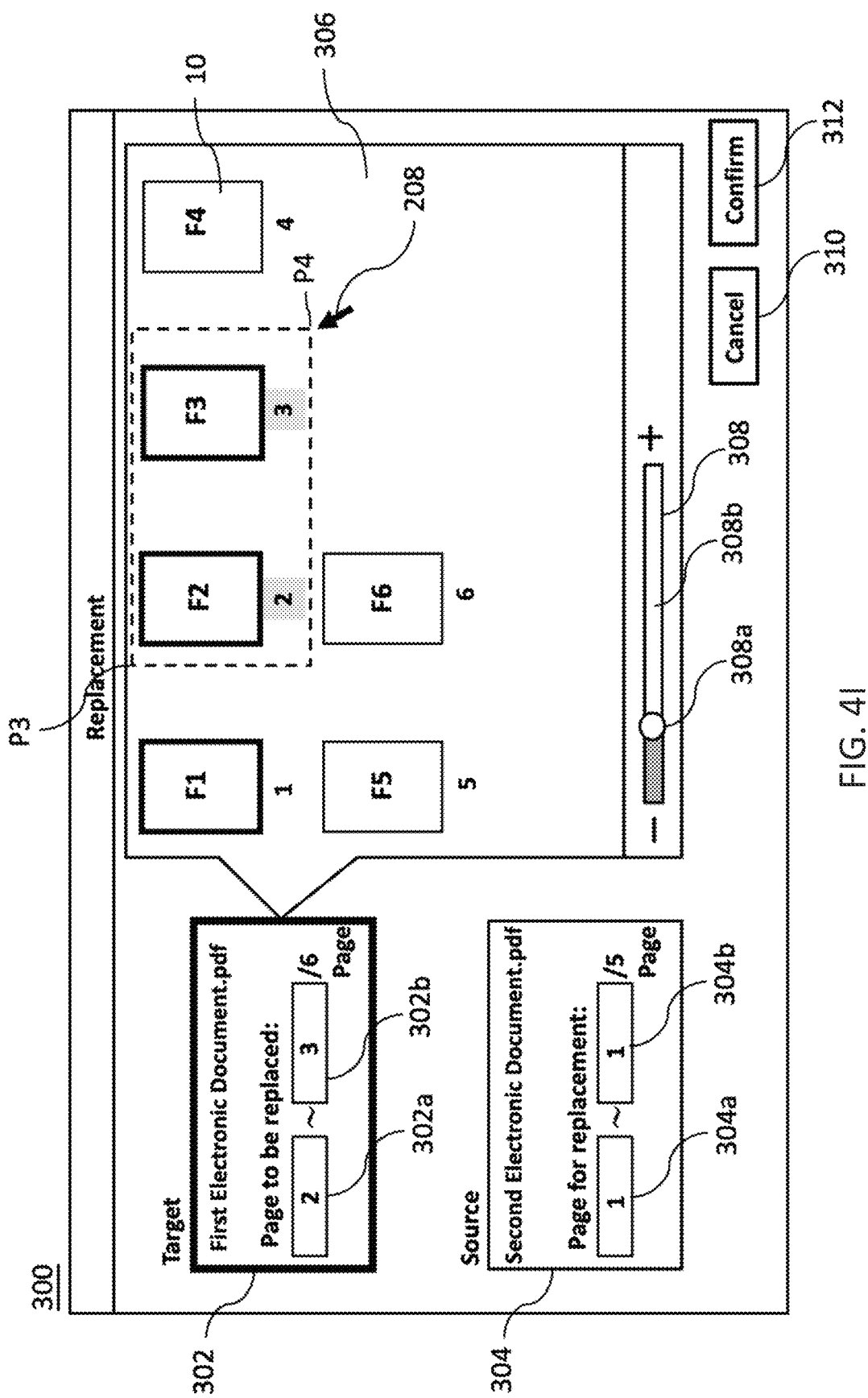

Referring to FIG. 3B, FIG. 4F and FIG. 4I, after the two page numbers received by the two input fields 302a and 302b of the first input region 302 are 1 and 2 to determine the first page change position, the method for modifying pages of an electronic document disclosed by the present embodiment may further include steps S307a, S307b, S307c for changing the first page change position to a second page change position.

In step S307a, as shown in FIG. 4F, after the first page change position (e.g., page F1 and page F2) is selected and determined by a first input inputted to the two input fields 302a, 302b of the first input region 302, the processor 102 will drive the display 104 to display at least one first page number (e.g., 1 and 2) on the first input region 302.

In step S307b, as shown in FIG. 4I, the processor 102 will select a second page change position (e.g., page F2 and page F3) located in the plurality of first pages (e.g., six pages F1 to F6) of the first electronic document 10 displayed on the page preview region 306 according to a first selection event. In the present embodiment, the first selection event may be at least one click selection operation or a frame selection operation performed by the cursor 208 controlled by the first input device 108 with respect to the page to be replaced. For example, the cursor 208 controlled by the first input device 108 can perform a frame selection operation (or two click selection operations) with respect to the page F2 and the page F3 by dragging from a point P3 to a point P4 so as to mark (e.g., highlight) the page F2 and the page F3, thereby changing the first page change position (e.g., page F1 and page F2) to the second page change position (e.g., page F2 and page F3).

In step S307c, the processor 102 will change the at least one first page number (e.g., 1 and 2) displayed on the first input region 302 to at least one second page number (e.g., 2 and 3) associated with the second page change position (e.g., page F2 and page F3) according to the second page change position (e.g., page F2 and page F3). In the present embodiment, the selection of the second page change position interacts with the first input. In other words, the second page change position can also be changed to another page change position (e.g., page F3 and page F4) through another input (e.g., 3 and 4) received by the two input fields 302a, 302b of the first input region 302.

Figure 4J:
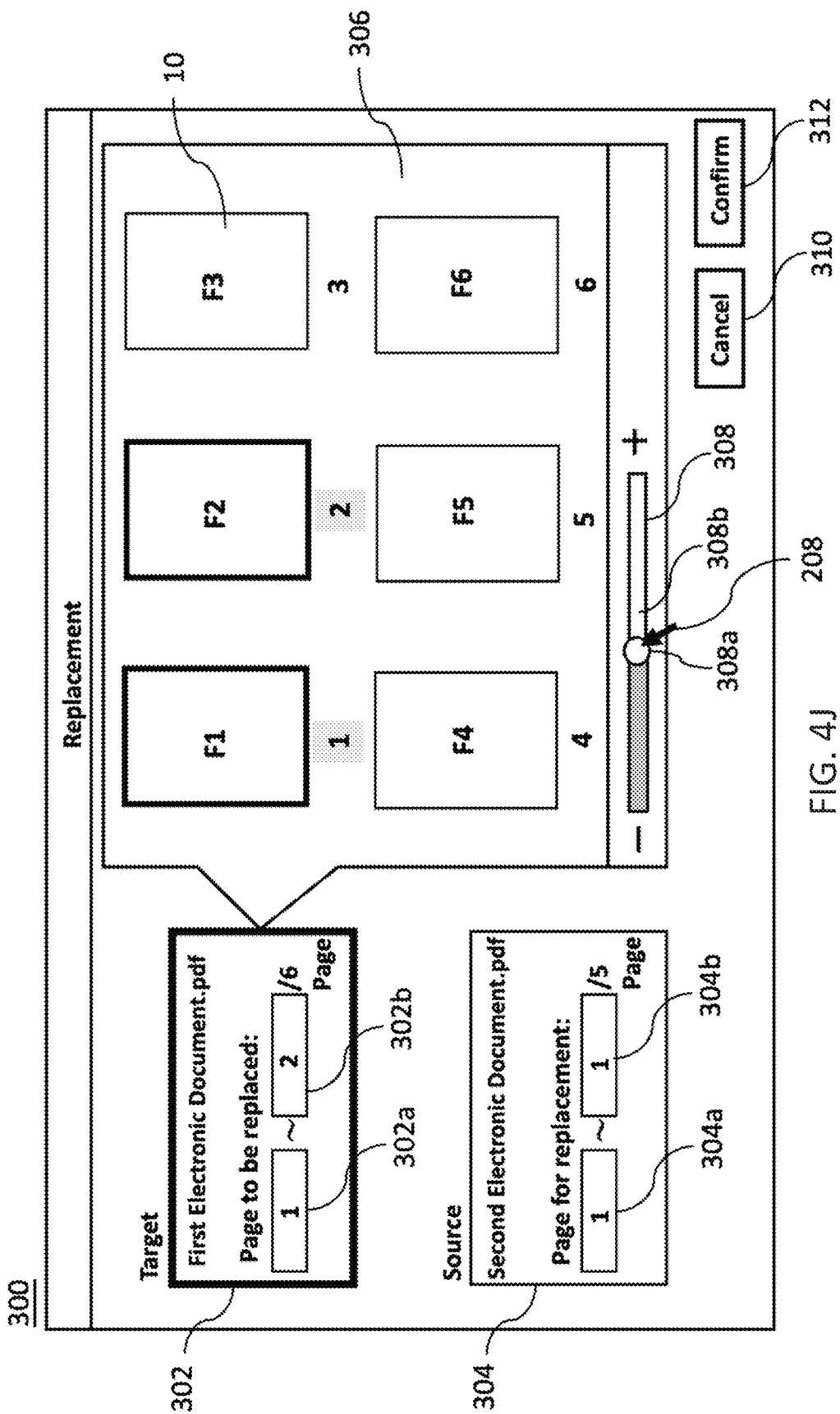

In the first embodiment, the method for modifying pages of an electronic document may further comprise the following step: when the processor 102 detects that the first input region 302 is selected, the processor 102 will adjust the size of the pages F1 to F6 on the page preview region 306 according to a fourth operation event performed with respect to the zoom control element 308. For example, as shown in FIG. 4J, the fourth operation event can be a movement of the slide button 308a toward the "+" icon along the slide track 308b by a dragging operation performed by the cursor 208 controlled by the first input device 108, so as to enlarge the size of the pages F1 to F6 displayed on the page preview region 306. Alternatively, the fourth operation event can be a movement of the slide button 308a toward the "−" icon along the slide track 308b by a dragging operation performed by the cursor 208 controlled by the first input device 108, so as to reduce the size of the pages F1 to F6 displayed on the page preview region 306.

Figure 4K:
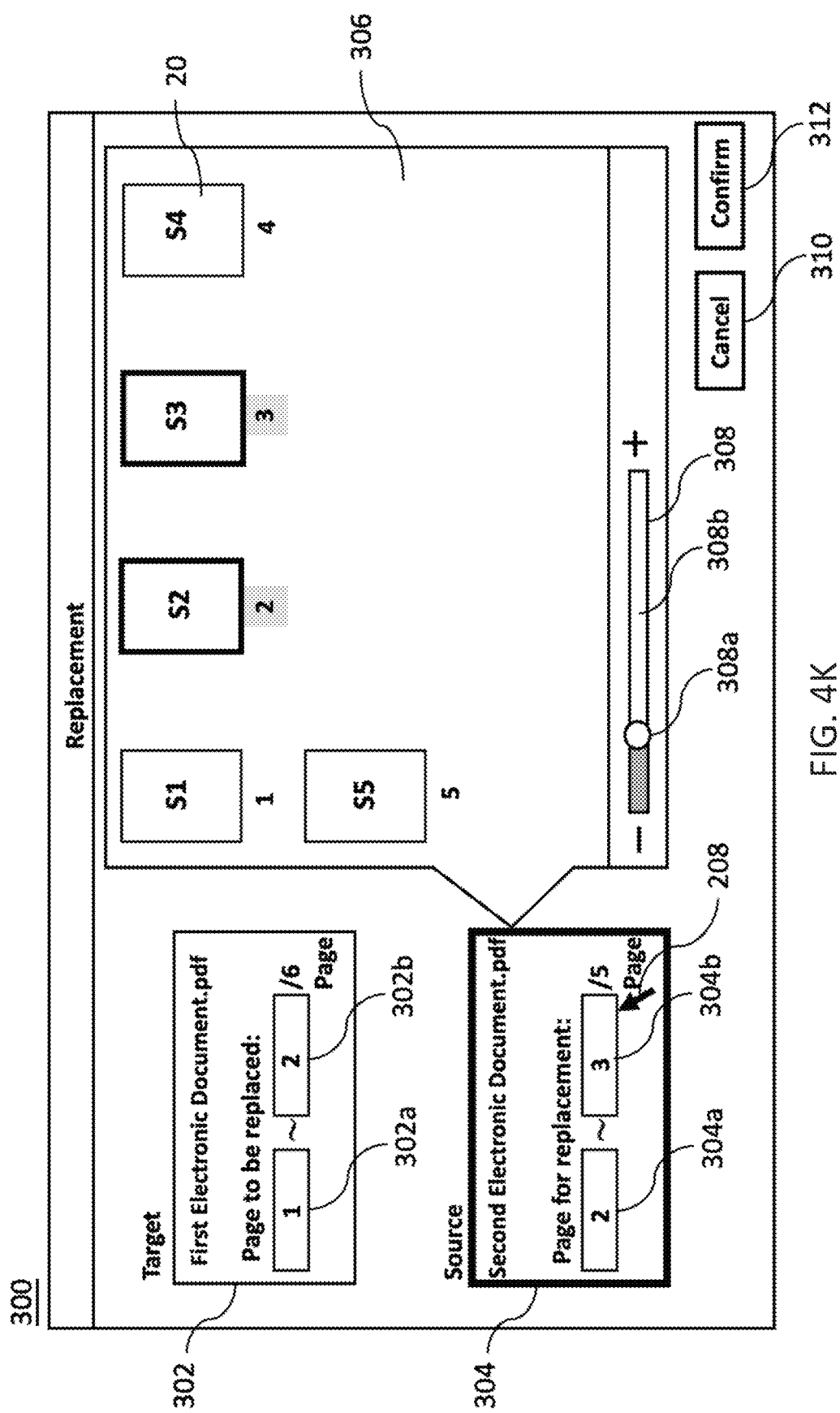
Figure 4L:
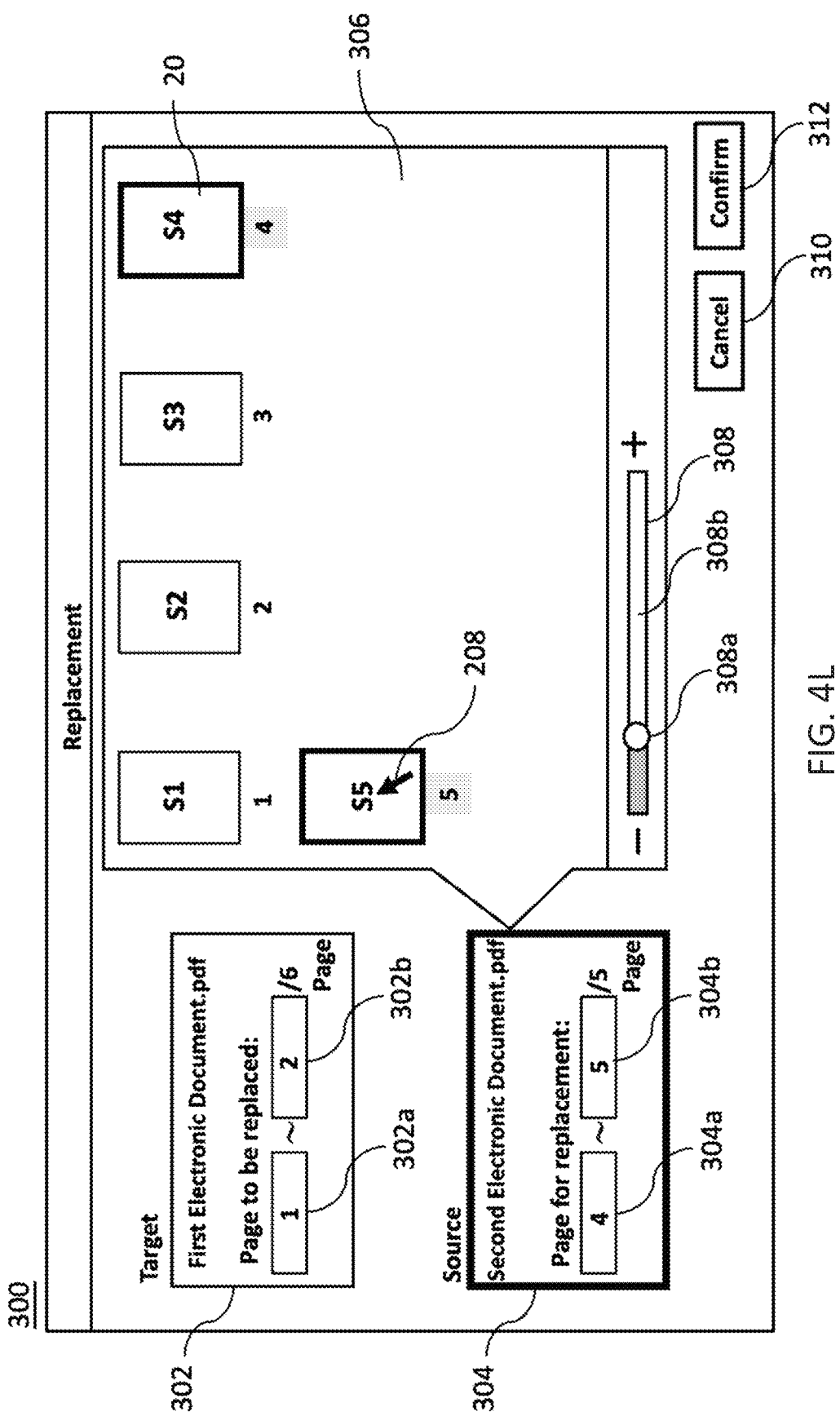
Figure 4M:
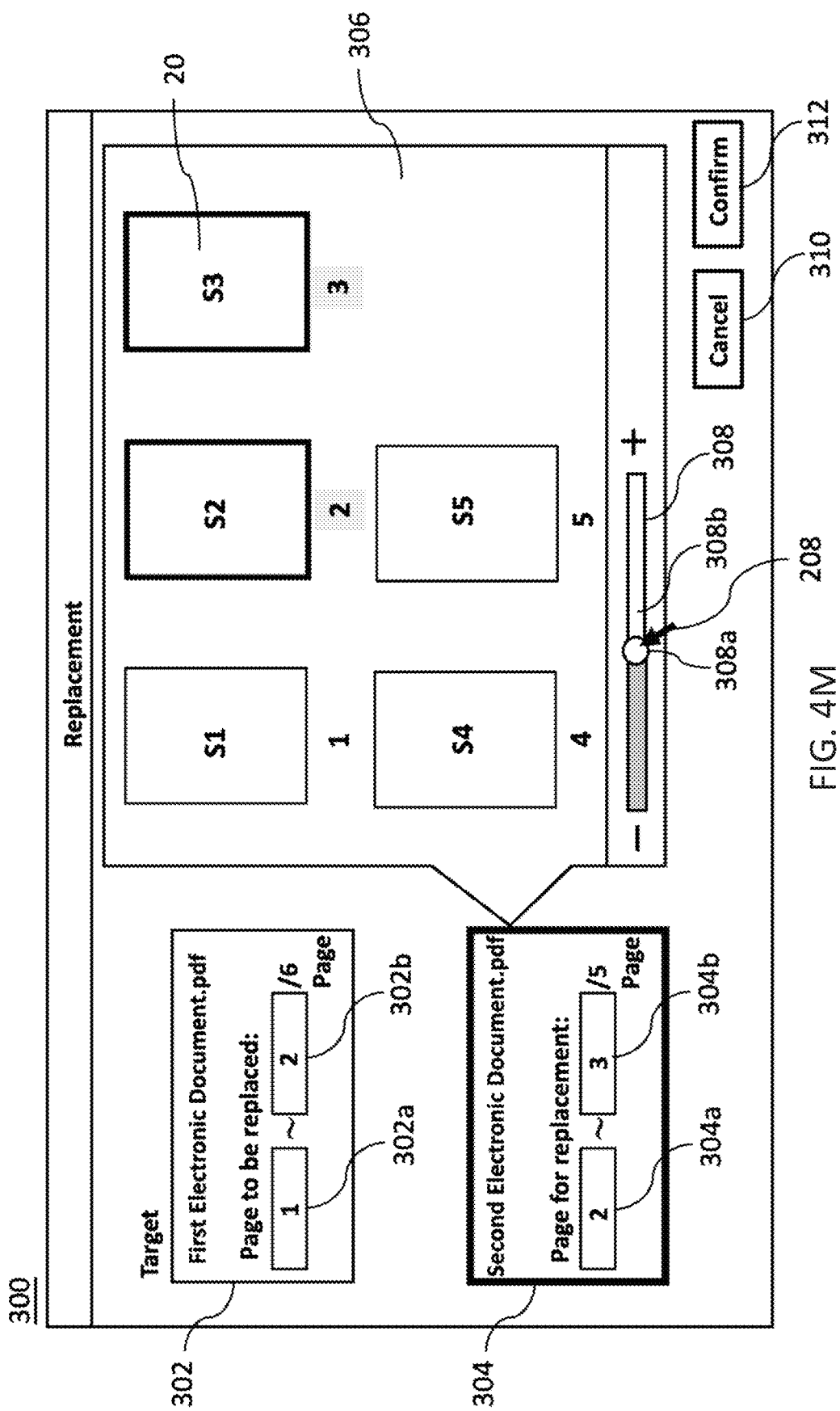

In step S308, the processor 102 will detect whether the second input region 304 is selected. In the first embodiment, the processor 102 will detect whether the second input region 304 is clicked and selected by the cursor 208 controlled by the first input device 108, as shown in FIG. 4K. When the processor 102 detects that the second input region 304 is selected, proceed to step S310. Otherwise, continue to proceed to step S308.

In step S310, when the processor 102 detects that the second input region 304 is selected, the processor 102 will drive the display 104 to display a plurality of second pages of the second electronic document 20 on the page preview region 306 and determine at least one second page of the plurality of second pages according to a second operation event, as shown in FIG. 4K. In the first embodiment, the plurality of second pages are five pages S1 to S5, and the at least one second page is the page S2 and the page S3 (i.e., the pages to be used for replacement) and is represented by page numbers corresponding to the page S2 and the page S3. In other embodiments, the at least one second page can be one page or more than two pages of the second electronic document 20, and is not limited to two pages. In the first embodiment, when the processor 102 detects that the second input region 304 is clicked and selected by the cursor 208 controlled by the first input device 108, the selected second input region 304 can be marked (e.g., highlighted) to indicate that it has been selected, and the processor 102 will drive the display 104 to display the five pages S1 to S5 of the second electronic document 20 on the page preview region 306. In addition, when the processor 102 detects that the second input region 304 is clicked and selected by the cursor 208, the processor 102 will determine the page S2 and the page S3 (i.e., the pages to be used for replacement) of the five pages S1 to S5 according to a second operation event. In the first embodiment, the second operation event can be receiving from the two input fields 304a, 304b of the second input region 304 a second input that is inputted by the second input device 110 (e.g., a keyboard) and associated with the at least one second page, wherein the second input includes at least one third page number corresponding to the at least one second page. In the present embodiment, the at least one second page of the second electronic document 20 is the page S2 (i.e., the second page) and the page S3 (i.e., the third page), so the at least one third page number corresponding to the at least one second page and being included by the second input is 2 and 3. Further, the step of determining the at least one second page of the plurality of second pages according to the second operation event further comprises: marking the two pages S2, S3 corresponding to the two page numbers (i.e., 2 and 3) among the five pages S1 to S5 of the second electronic document 20 displayed on the page preview region 306 according to the two page numbers (i.e., 2 and 3). In other words, when the second input is received by the two input fields 304a, 304b, the two pages S2, S3 corresponding to the two page numbers (i.e., 2 and 3) can be marked (e.g., highlighted) on the page preview region 306 to indicate that the two pages S2, S3 have been selected and determined. In another embodiment, when the page to be used for replacement in the second electronic document 20 is only one page, the second input received by the two input fields 304a, 304b is two identical page numbers. For example, when the page to be used for replacement in the second electronic document 20 is only the page S3, the second input received by the two input fields 304a, 304b is 3 and 3, respectively.

Similarly, the second operation event may also be at least one click selection operation or a frame selection operation performed by the cursor 208 controlled by the first input device 108 with respect to the page to be used for replacement (e.g., page S2 and page S3). The operation means of at least one click selection operation or a frame selection operation performed with respect to the page to be used for replacement (e.g., page S2 and page S3) is the same as the above-mentioned operation means of at least one click selection operation (as shown in FIG. 4G) or a frame selection operation (as shown in FIG. 4H) performed with respect to the page to be replaced (e.g., page F1 and page F2), and thus the detail thereof is omitted without being described herein.

Figure 4N:
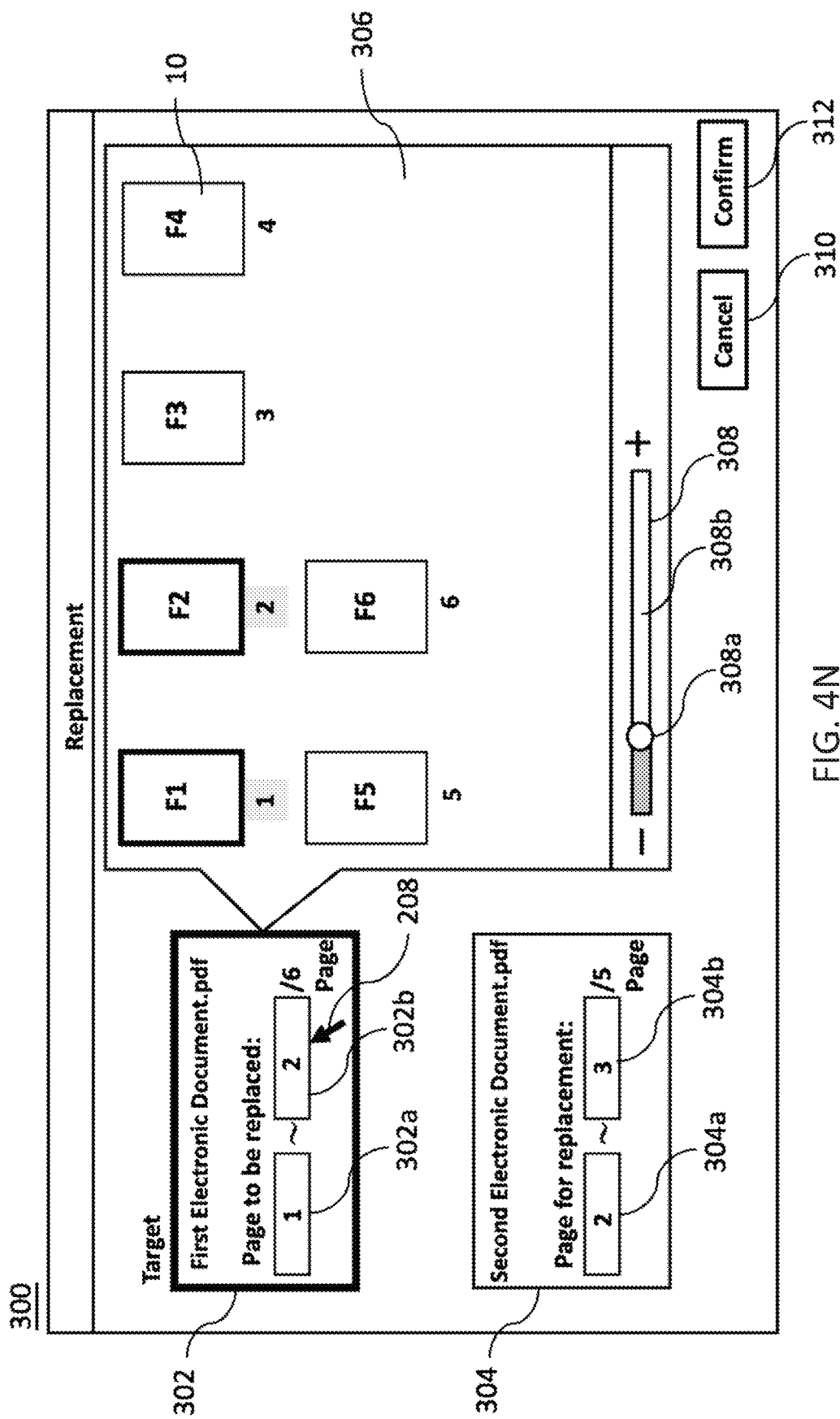

Referring now to FIG. 1, FIG. 4K and FIG. 4N, the processor 102 can drive the display 104 to display the pages F1 to F6 of the first electronic document 10 or the pages S1 to S5 of the second electronic document 20 on the page preview region 306 according to whether the first input region 302 or the second input region 304 is selected. In the first embodiment, the method for modifying pages of an electronic document may further comprise the following step: when the processor 102 detects that the first input region 302 is selected (as shown in FIG. 4N), the processor 102 will drive the display 104 to switch the pages S1-S5 (as shown in FIG. 4K) of the second electronic document 20 displayed on the page preview region 306 to the pages F1-F6 of the first electronic document 10 (as shown in FIG. 4N); and when the processor 102 detects that the second input region 304 is selected (as shown in FIG. 4K), the processor 102 will drive the display 104 to switch the pages F1-F6 of the first electronic document 10 (as shown in FIG. 4N) displayed on the page preview region 306 to the pages S1-S5 of the second electronic document 20 (as shown in FIG. 4K).

In addition, in the first embodiment, the at least one second page may alternatively be selected and determined either by a second input inputted to the two input fields 304a, 304b of the second input region 304 or by at least one click selection operation or a frame selection operation performed by the cursor 208 with respect to the at least one second page of the second electronic document 20 on the page preview region 306. In another embodiment, after the at least one second page is selected and determined by a second input inputted to the two input fields 304a, 304b of the second input region 304, the at least one second page can be further changed to at least one third page by at least one click selection operation or a frame selection operation performed by the cursor 208 with respect to at least one second page of the second electronic document 20 on the page preview region 306. Hereinafter, a click selection operation is taken as an example and described with reference to FIG. 3C, FIG. 4K and FIG. 4L. On the contrary, after the at least one second page is selected and determined by at least one click selection operation or a frame selection operation performed by the cursor 208 with respect to at least one second page of the second electronic document 20 on the page preview region 306, the at least one second page can be further changed to at least one third page by a second input inputted to the two input fields 304a, 304b of the second input region 304.

Figure 3C:
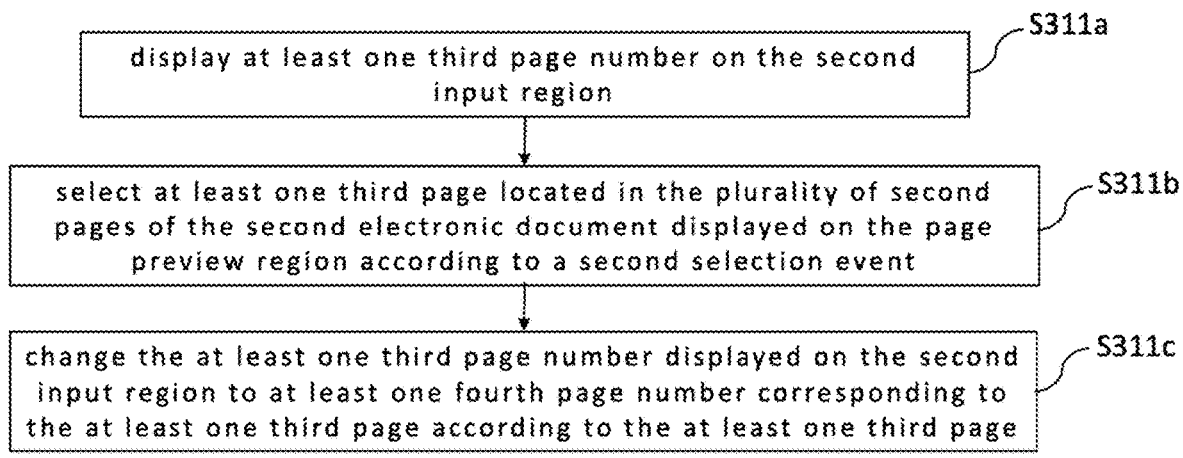

Referring to FIG. 3C, FIG. 4K and FIG. 4L, after the two page numbers received by the two input fields 304a and 304b of the second input region 304 are 2 and 3 to determine the at least one second page, the method for modifying pages of an electronic document disclosed by the present embodiment may further include steps S311a, S311b, S311c for changing the at least one second page to at least one third page.

In step S311a, as shown in FIG. 4K, after the at least one second page (e.g., page S2 and page S3) is selected and determined by a second input inputted to the two input fields 304a, 304b of the second input region 304, the processor 102 will drive the display 104 to display at least one third page number (e.g., 2 and 3) on the second input region 304.

In step S311b, as shown in FIG. 4L, the processor 102 will select at least one third page (e.g., page S4 and page S5) located in the plurality of second pages (e.g., five pages S1 to S5) of the second electronic document 20 displayed on the page preview region 306 according to a second selection event. In the present embodiment, the second selection event may be at least one click selection operation or a frame selection operation performed by the cursor 208 controlled by the first input device 108 with respect to the page to be used for replacement. For example, the cursor 208 controlled by the first input device 108 can be moved respectively to the page number S4 and the page number S5 to perform two click selection operations (or a frame selection operation) so as to mark (e.g., highlight) the page S4 and the page S5, thereby changing the at least one second page (e.g., page S2 and page S3) to the at least one third page (e.g., page S4 and page S5).

In step S311c, the processor 102 will change the at least one third page number (e.g., 2 and 3) displayed on the second input region 304 to at least one fourth page number (e.g., 4 and 5) corresponding to the at least one third page (e.g., page S4 and page S5) according to the at least one third page (e.g., page S4 and page S5). In the present embodiment, the selection of the at least one third page interacts with the second input. In other words, the at least one third page can also be changed to another page (e.g., page S1 and page S2) through another input (e.g., 1 and 2) received by the two input fields 304a, 304b of the second input region 304.

In the first embodiment, the method for modifying pages of an electronic document may further comprise the following step: when the processor 102 detects that the second input region 304 is selected, the processor 102 will adjust the size of the pages S1 to S5 on the page preview region 306 according to a fifth operation event performed with respect to the zoom control element 308. For example, as shown in FIG. 4M, the fifth operation event can be a movement of the slide button 308a toward the "+" icon along the slide track 308b by a dragging operation performed by the cursor 208 controlled by the first input device 108, so as to enlarge the size of the pages S1 to S5 displayed on the page preview region 306. Alternatively, the fifth operation event can be a movement of the slide button 308a toward the "−" icon along the slide track 308b by a dragging operation performed by the cursor 208 controlled by the first input device 108, so as to reduce the size of the pages S1 to S5 displayed on the page preview region 306.

Figure 4O:
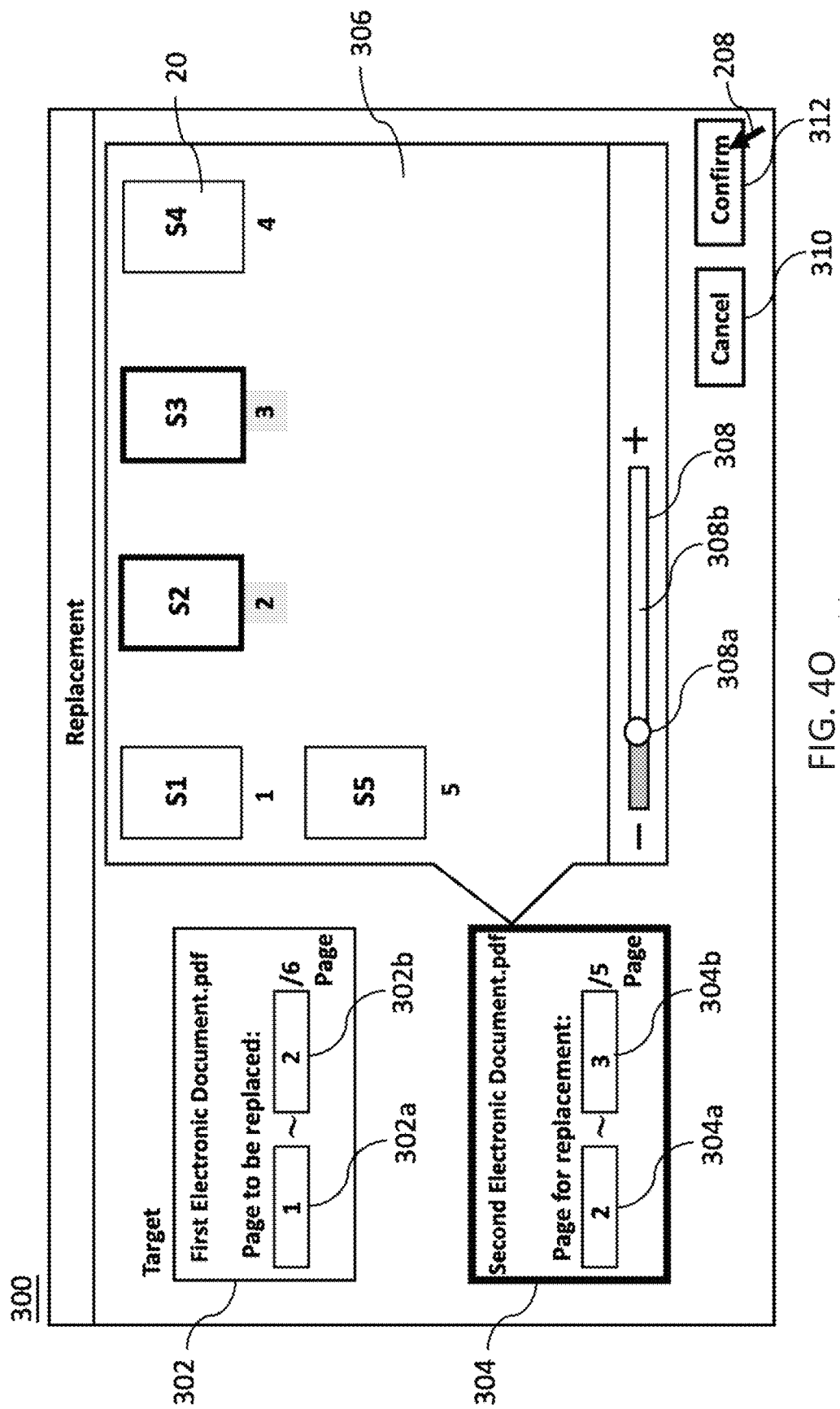
Figure 4P:
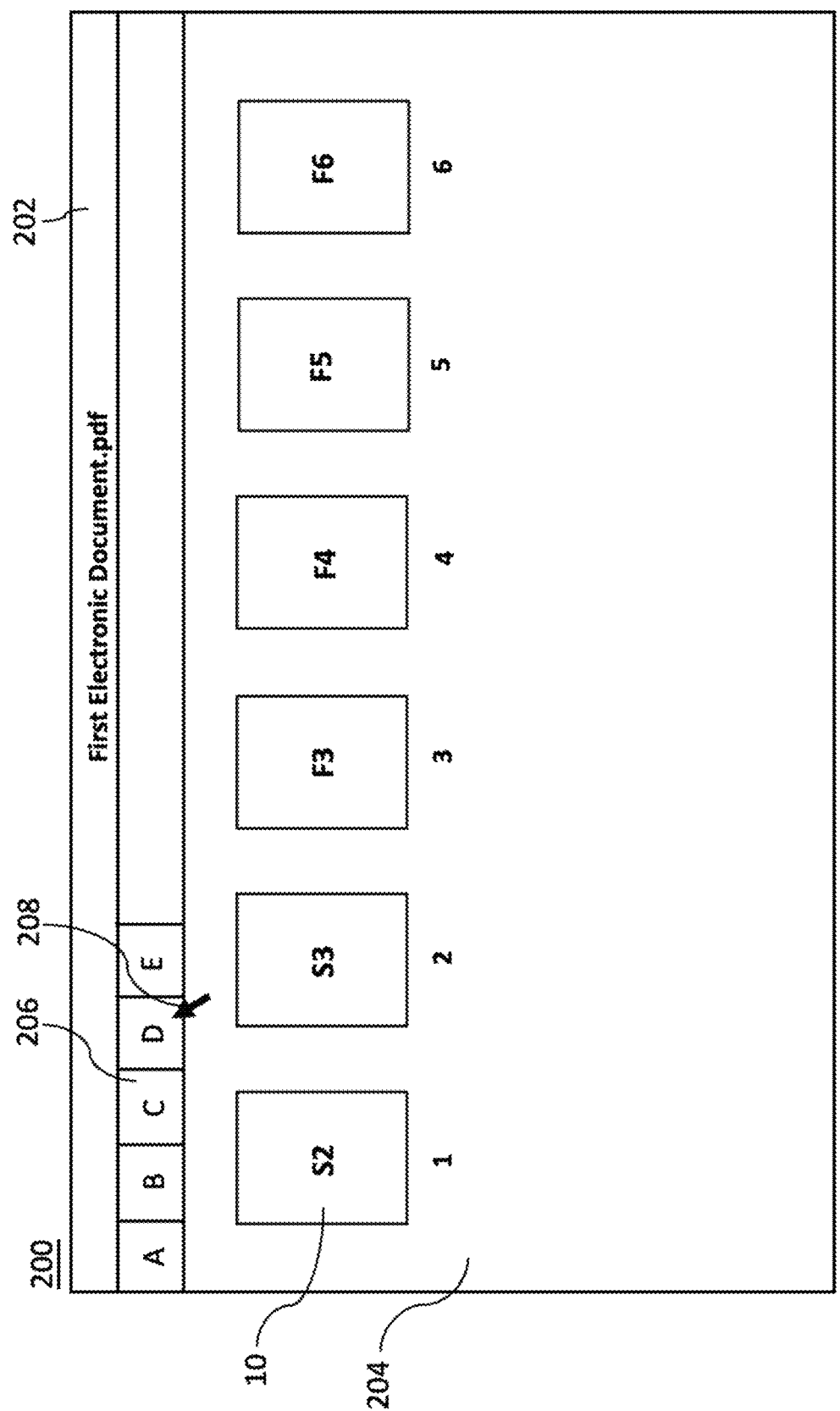

In step S312, after the processor 102 determines a first page change position in the first electronic document 10 and at least one second page in the second electronic document 20, the processor 102 will add the at least one second page to the first page change position according to a third operation event. In the first embodiment, the third operation event may be a click selection operation (as shown in FIG. 4O) performed by the cursor 208 controlled by the first input device 108 with respective to the confirmation button 312, and the step of adding the at least one second page to the first page change position is implemented by the processor 102 replacing the page F1 and the page F2 of the first electronic document 10 with the page S2 and the page S3 of the second electronic document 20. More specifically, after the cursor 208 controlled by the first input device 108 performs a click selection operation with respect to the confirmation button 312 (as shown in FIG. 4O), the processor 102 will replace the page F1 and the page F2 of the first electronic document 10 with the page S2 and the page S3 of the second electronic document 20, and close the first user operation interface 300, so as to drive the display 104 to redisplay the document editing interface 200 to present a new first electronic document 10 with pages replaced by the page S2 and the page S3, as shown in FIG. 4P. In FIG. 4P, the new first electronic document 10 has the page F1 and the page F2 removed and includes the pages S2, S3 and the pages F3 to F6 arranged in order. In the first embodiment, when the cursor 208 controlled by the first input device 108 performs a click selection operation with respect to the function option D (as shown in FIG. 4P), the processor 102 will store the new first electronic document 10 in the storage 106 of the electronic apparatus 100 or in a storage in a remote apparatus.

In the second embodiment, the method for modifying pages of an electronic document is to add two pages of a second electronic document 20 to a first page change position located in a first electronic document 10, as shown in FIG. 6A to FIG. 6G.

It should be understood that the second embodiment differs from the first embodiment mainly in the following two aspects:
1. A first page change position disclosed in the first embodiment refers to a position where at least one first page of a first electronic document is located, and at least one second page of a second electronic document will replace the at least one first page of the first electronic document. However, a first page change position disclosed in the second embodiment refers to a page insertion position in a first electronic document, and at least one second page of a second electronic document will be inserted to the page insertion position of the first electronic document.
2. The two input regions disclosed in the first embodiment are different from the two input regions disclosed in the second embodiment.

Therefore, the differences between the first embodiment and the second embodiment will be described hereinafter, and the elements used in the second embodiment that are the same as those used in the first embodiment will be denoted by the same reference numerals in the drawings, and thus the description therefor is omitted without being described.

In the second embodiment, the method for modifying pages of an electronic document is to have two pages of a second electronic document 20 inserted into a first electronic document 10, as shown in FIG. 6A to FIG. 6G.

In step S300, the processor 102 can select the first electronic document 10 and the second electronic document 20 according to the control of the first input device 108 or the second input device 110. In the second embodiment, the processor 102 selects the first electronic document 10 and the second electronic document 20 in a manner substantially the same as that disclosed in the first embodiment (as shown in FIG. 4A to FIG. 4D), and thus is not described in detail herein. The only difference is that, in FIG. 4C, the first input device 108 can control the cursor 208 and move the cursor 208 from the function option B to the function option C (e.g., "insert page" option) to perform a click selection operation to open a second window 212 as shown in FIG. 4D for selecting the file of the second electronic document 20.

Figure 6A:
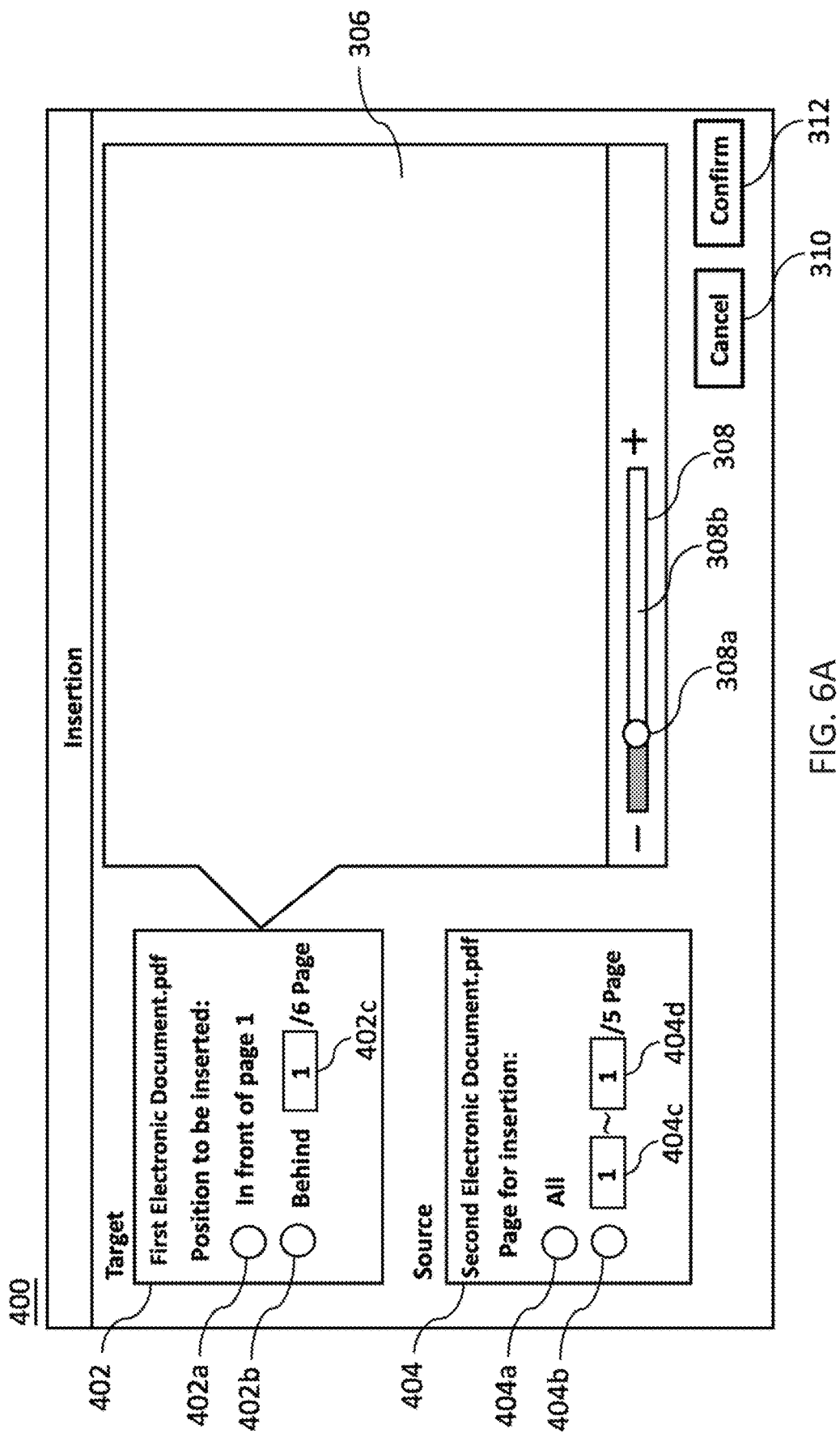
FIG. 6A to FIG. 6G are schematic diagrams of a document editing interface and a second user operation interface in different operation states according to a second embodiment of the present disclosure.

In step S302, after the first electronic document 10 and the second electronic document 20 are selected, the processor 102 will open a second user operation interface 400, as shown in FIG. 6A. The second user operation interface 400 includes a first input region 402, a second input region 404, a page preview region 306, a zoom control element 308, a cancel button 310 and a confirmation button 312. The first input region 402 is associated with the first electronic document 10 and has two input options 402a, 402b and an input field 402c. The input option 402a is selected to insert at least one second page of the second electronic document 20 to a position in front of the page F1 (i.e., the first page) in the first electronic document 10. The input option 402b is selected to insert at least one second page of the second electronic document 20 to a position, indicated by an input of the input field 402c, in the first electronic document 10. The second input region 404 is associated with the second electronic document 20 and has two input options 404a, 404b and two input field 404c, 404d. The input option 404a is selected to insert all second pages of the second electronic document 20 to the first electronic document 10. The input option 404b is selected to insert to the first electronic document 10 at least one second page of the second electronic document 20 indicated by the input of the two input fields 404c, 404d. In the second embodiment, the page preview region 306 can selectively present the pages of the first electronic document 10 or the pages of the second electronic document 20. In other embodiments, the page preview region 306 can simultaneously present the pages of the first electronic document 10 and the pages of the second electronic document 20 at the same time. The cancel button 310 is used to cancel a page inserting operation between two electronic documents and close the second user operation interface 400. The confirmation button 312 is used to confirm a page inserting operation between two electronic documents and close the second user operation interface 400.

Figure 6B:
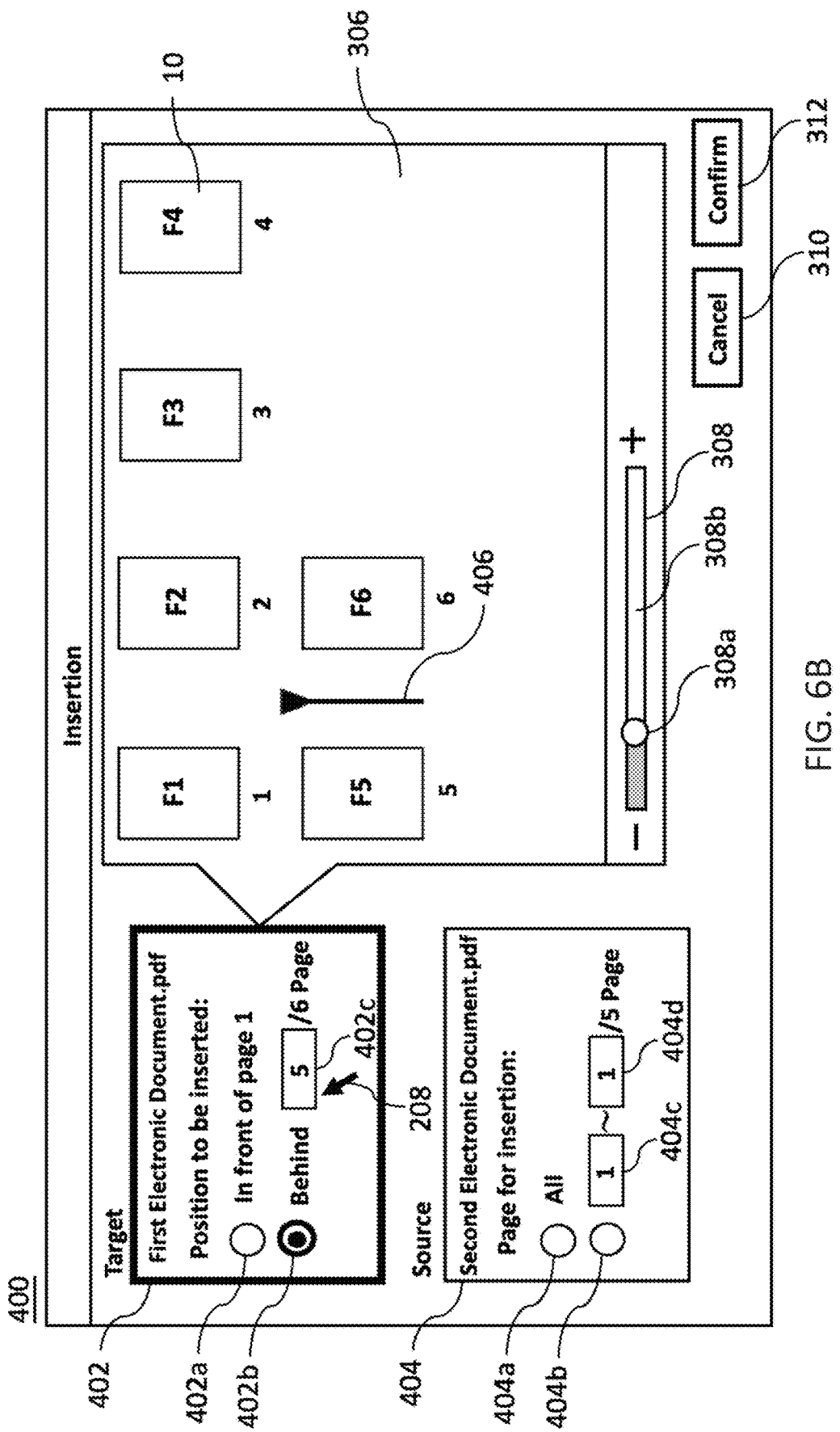

In step S304, the processor 102 will detect whether the first input region 402 is selected. In the second embodiment, the processor 102 will detect whether the first input region 402 is clicked and selected by the cursor 208 controlled by the first input device 108, as shown in FIG. 6B. When the processor 102 detects that the second input region 402 is selected, proceed to step S306. Otherwise, proceed to step S304.

In step S306, when the processor 102 detects that the second input region 402 is selected, the processor 102 will drive the display 104 to display a plurality of first pages of the first electronic document 10 on the page preview region 306 and determine a first page change position located in the plurality of first pages according to a first operation event, as shown in FIG. 6B. In the second embodiment, the plurality of first pages are six pages F1 to F6, and the first page change position is a position behind the page F5 and represented by a page number corresponding to the page F5. In the second embodiment, when the processor 102 detects that the first input region 402 is clicked and selected by the cursor 208 controlled by the first input device 108, the selected first input region 402 can be marked (e.g., highlighted) to indicate that it has been selected, and the processor 102 will drive the display 104 to display the six pages F1 to F6 of the first electronic document 10 on the page preview region 306. In addition, when the processor 102 detects that the first input region 402 is clicked and selected by the cursor 208, the processor 102 will determine a position behind the page F5 (i.e., a position to which at least one second page of the second electronic document 20 will be inserted) according to a first operation event. In the second embodiment, the first operation event can be selecting the input option 402b and receiving from the input field 402c of the first input region 402 a first input that is inputted by the second input device 110 (e.g., a keyboard) and associated with the first page change position, wherein the first input is associated with a page number corresponding to the first page change position. In the present embodiment, the first page change position located in the first electronic document 10 is a position behind the page F5 (i.e., the fifth page), so the page number corresponding to the first page change position and being associated with the first input is 5. Further, the step of determining the first page change position located in the plurality of first pages according to the first operation event further comprises: marking with an insertion icon 406 a position (i.e., a position behind the page F5) corresponding to the page number (i.e., 5) and being located in the six pages F1 to F6 of the first electronic document 10 displayed on the page preview region 306 according to the page number (i.e., 5). In other words, when the input field 402c receives the first input, the position (i.e., the position behind the page F5) corresponding to the page number (i.e., 5) can be marked with the insertion icon 406 on the page preview region 306 so as to indicate that the position has been selected and determined. In another embodiment, the first operation event may be that the input option 402a is selected, and the selection of the input option 402a may be regarded as an input and associated with a page number (i.e., the page number of the page F1) corresponding to the first page change position for indicating that at least one second page of the second electronic document 20 is inserted to a position in front of the page F1 (i.e., the first page) in the first electronic document 10.

In the second embodiment, the first operation event can also be a click selection operation performed by the cursor 208 controlled by the first input device 108 with respect to a position (e.g., a position behind the page F2) into which at least one second page of the second electronic document 20 will be inserted.

Figure 6C:
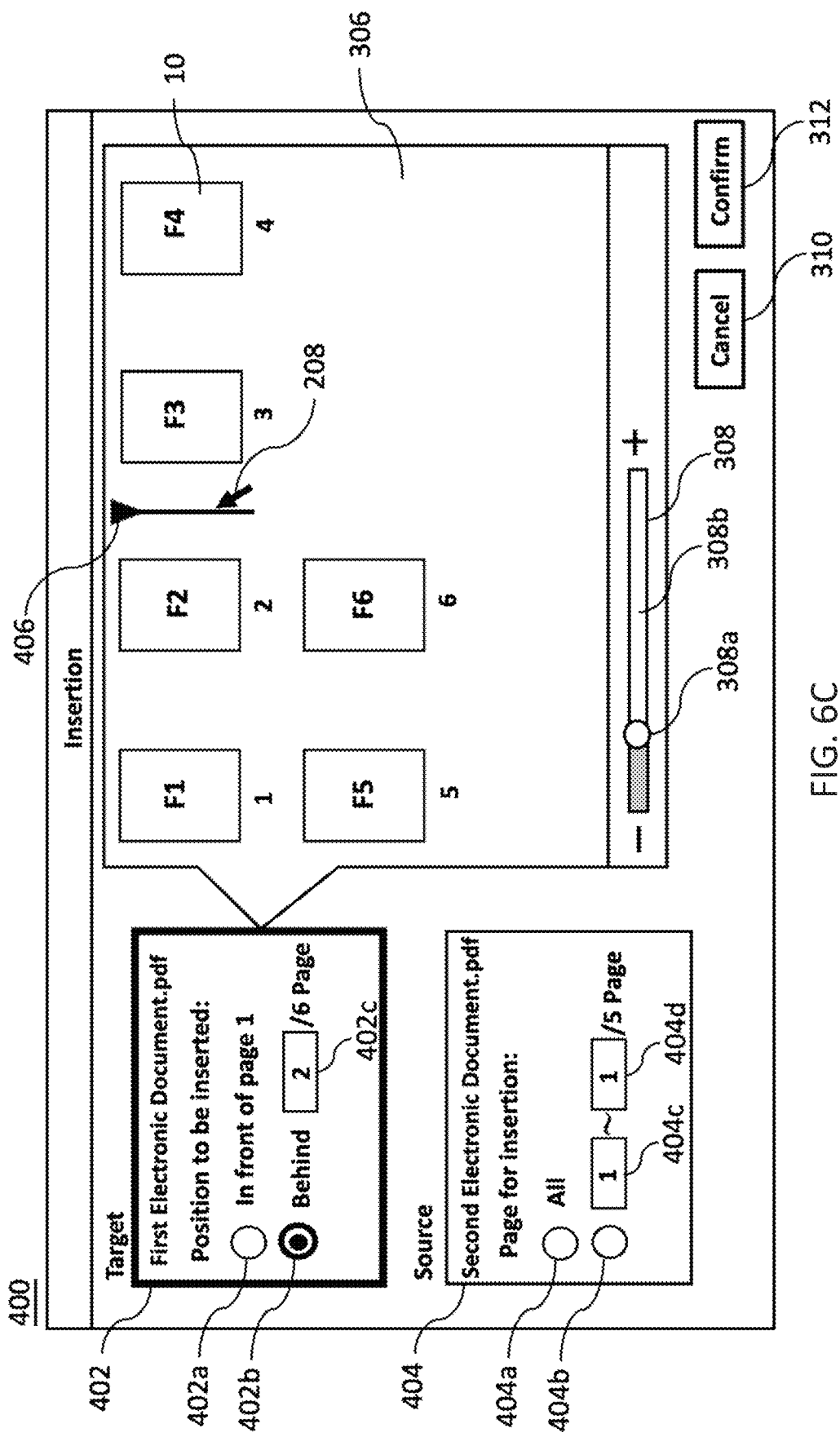

Referring to FIG. 6C, the cursor 208 controlled by the first input device 108 can perform a click selection operation with respect to a position behind the page F2 so as to mark the position behind the page F2 with the insertion icon 406, thereby selecting and determining the position behind the page F2 as the first page change position. In the present embodiment, when a position behind the page F2 is clicked and selected by the cursor 208, the insertion icon 406 is automatically displayed at the position behind the page F2, and the input field 402c can automatically display a page number (i.e., 2) corresponding to the page F2.

In addition, in the second embodiment, the first page change position can be selected and determined by the selection of the input option 402a of the first input region 402, by the selection of the input option 402b of the first input region 402 in conjunction with a first input of the input field 402c, or by a click selection operation performed by the cursor 208 with respect to a position located in the first electronic document 10 on the page preview region 306. In another embodiment, after the first page change position is selected and determined by the selection of the input option 402a or by the selection of the input option 402b in conjunction with the first input in the input field 402c, the first page change position can be further changed to a second page change position by a click selection operation performed by the cursor 208 with respect to a position located in the first electronic document 10 on the page preview region 306. On the contrary, after the first page change position is selected and determined by at least one click selection operation performed by the cursor 208 with respect to a position located in the first electronic document 10 on the page preview region 306, the first page change position can be further changed to a second page change position by the selection of the input option 402a or by the selection of the input option 402b in conjunction with the first input in the input field 402c. In the second embodiment and another embodiment, the selection of the first page change position and the selection of the second page change position both interact with the first input of the input field 402c.

Similarly, in the second embodiment, the method for modifying pages of an electronic document may further comprise the following step: when the processor 102 detects that the first input region 402 is selected, the processor 102 will adjust the size of the pages F1 to F6 on the page preview region 306 according to a fourth operation event performed with respect to the zoom control element 308. The fourth operation event in the second embodiment is the same as the fourth operation event in the first embodiment, and thus is not described in detail herein.

In step S308, the processor 102 will detect whether the second input region 404 is selected. In the second embodiment, the processor 102 will detect whether the second input region 404 is clicked and selected by the cursor 208 controlled by the first input device 108, as shown in FIG. 6D.

When the processor 102 detects that the second input region 404 is selected, proceed to step S310. Otherwise, continue to proceed to step S308.

Figure 6D:
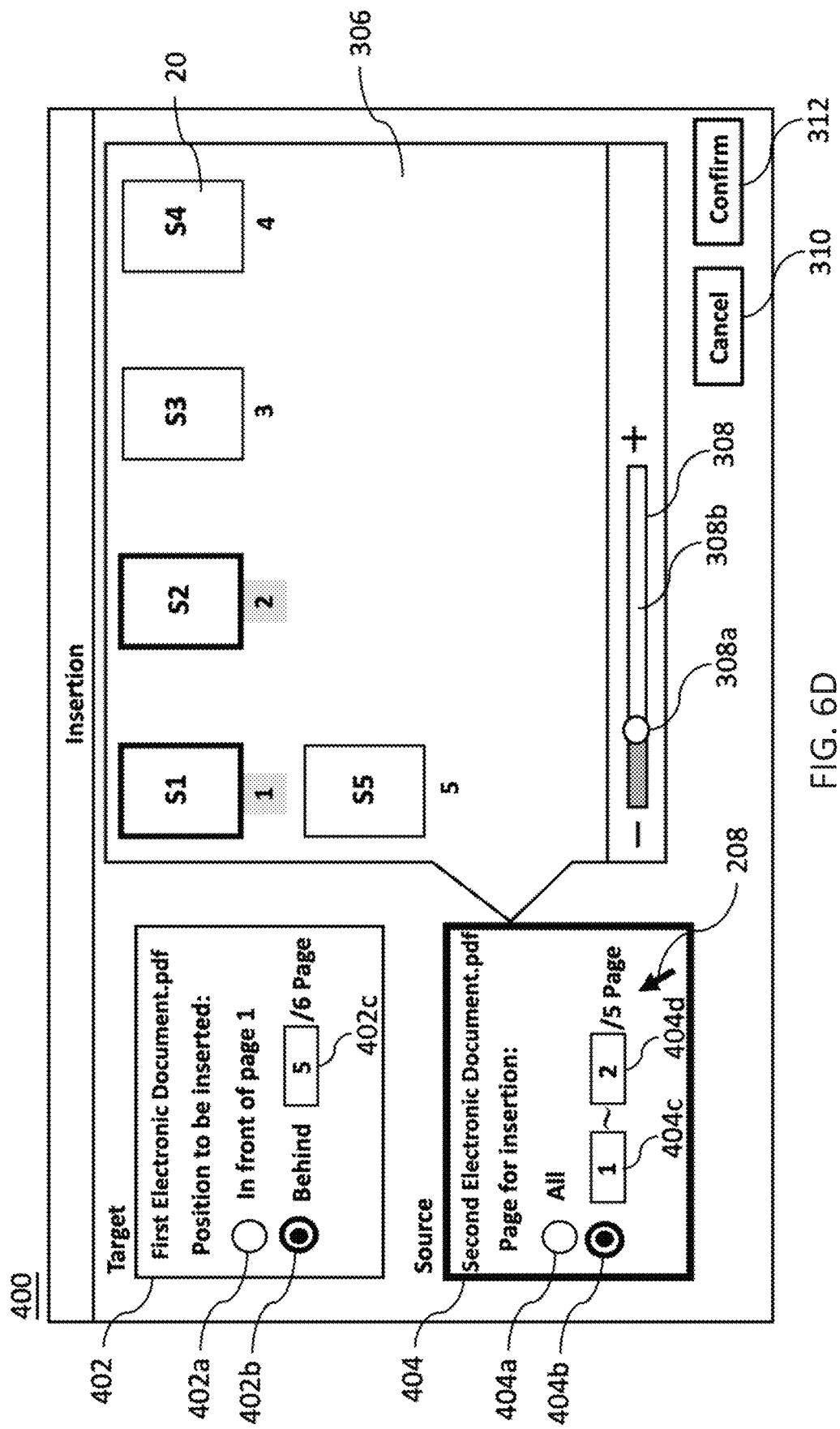

In step S310, when the processor 102 detects that the second input region 404 is selected, the processor 102 will drive the display 104 to display a plurality of second pages of the second electronic document 20 on the page preview region 306 and determine at least one second page of the plurality of second pages according to a second operation event, as shown in FIG. 6D. In the second embodiment, the plurality of second pages are five pages S1 to S5, and the at least one second page is the page S1 and the page S2 (i.e., the pages to be used for insertion) and is represented by page numbers corresponding to the page S1 and the page S2. In other embodiments, the at least one second page can be one page or more than two pages of the second electronic document 20, and is not limited to two pages. In the second embodiment, when the processor 102 detects that the second input region 404 is clicked and selected by the cursor 208 controlled by the first input device 108, the selected second input region 404 can be marked (e.g., highlighted) to indicate that it has been selected, and the processor 102 will drive the display 104 to display the five pages S1 to S5 of the second electronic document 20 on the page preview region 306. In addition, when the processor 102 detects that the second input region 404 is clicked and selected by the cursor 208, the processor 102 will determine the page S1 and the page S2 (i.e., the pages to be used for insertion) of the five pages S1 to S5 according to a second operation event. In the second embodiment, the second operation event can be the selection of the input option 404b and receiving from the input fields 404c, 404d of the second input region 404 a second input that is inputted by the second input device 110 (e.g., a keyboard) and associated with the at least one second page, wherein the second input includes at least one third page number corresponding to the at least one second page. In the present embodiment, the at least one second page of the second electronic document 20 is the page S1 (i.e., the first page) and the page S2 (i.e., the second page), so the at least one third page number corresponding to the at least one second page and being included by the second input is 1 and 2. Further, the step of determining the at least one second page of the plurality of second pages according to the second operation event further comprises: marking the two pages S1, S2 corresponding to the two page numbers (i.e., 1 and 2) among the five pages S1 to S5 of the second electronic document 20 displayed on the page preview region 306 according to the two page numbers (i.e., 1 and 2). In other words, when the second input is received by the two input fields 404c, 404d, the two pages S1, S2 corresponding to the two page numbers (i.e., 1 and 2) can be marked (e.g., highlighted) on the page preview region 306 to indicate that the two pages S1, S2 have been selected and determined. In another embodiment, when the page to be used for insertion in the second electronic document 20 is only one page, the second input received by the two input fields 404c, 404d is two identical page numbers. For example, when the page to be used for insertion in the second electronic document 20 is only the page S1, the second input received by the two input fields 404c, 404d is 1 and 1, respectively.

In another embodiment, the second operation event may be that the input option 404a is selected, and the selection of the input option 404a may be regarded as an input and associated with all page numbers (i.e., the page numbers of the pages F1 to F5) corresponding to the plurality of second pages of the second electronic document 20 for indicating that all pages of the second electronic document 20 are inserted to a position, indicated by the input field 402c, in the first electronic document 10.

Similarly, the second operation event may also be at least one click selection operation or a frame selection operation performed by the cursor 208 controlled by the first input device 108 with respect to the page to be used for insertion (e.g., page S1 and page S2). The operation means of at least one click selection operation or a frame selection operation performed with respect to the page to be used for insertion (e.g., page S1 and page S2) is the same as the operation means of at least one click selection operation (as shown in FIG. 4G) or a frame selection operation (as shown in FIG. 4H) performed with respect to the page to be replaced (e.g., page F1 and page F2), which is described above in the first embodiment, and thus the detail thereof is omitted without being described herein.

Figure 6E:
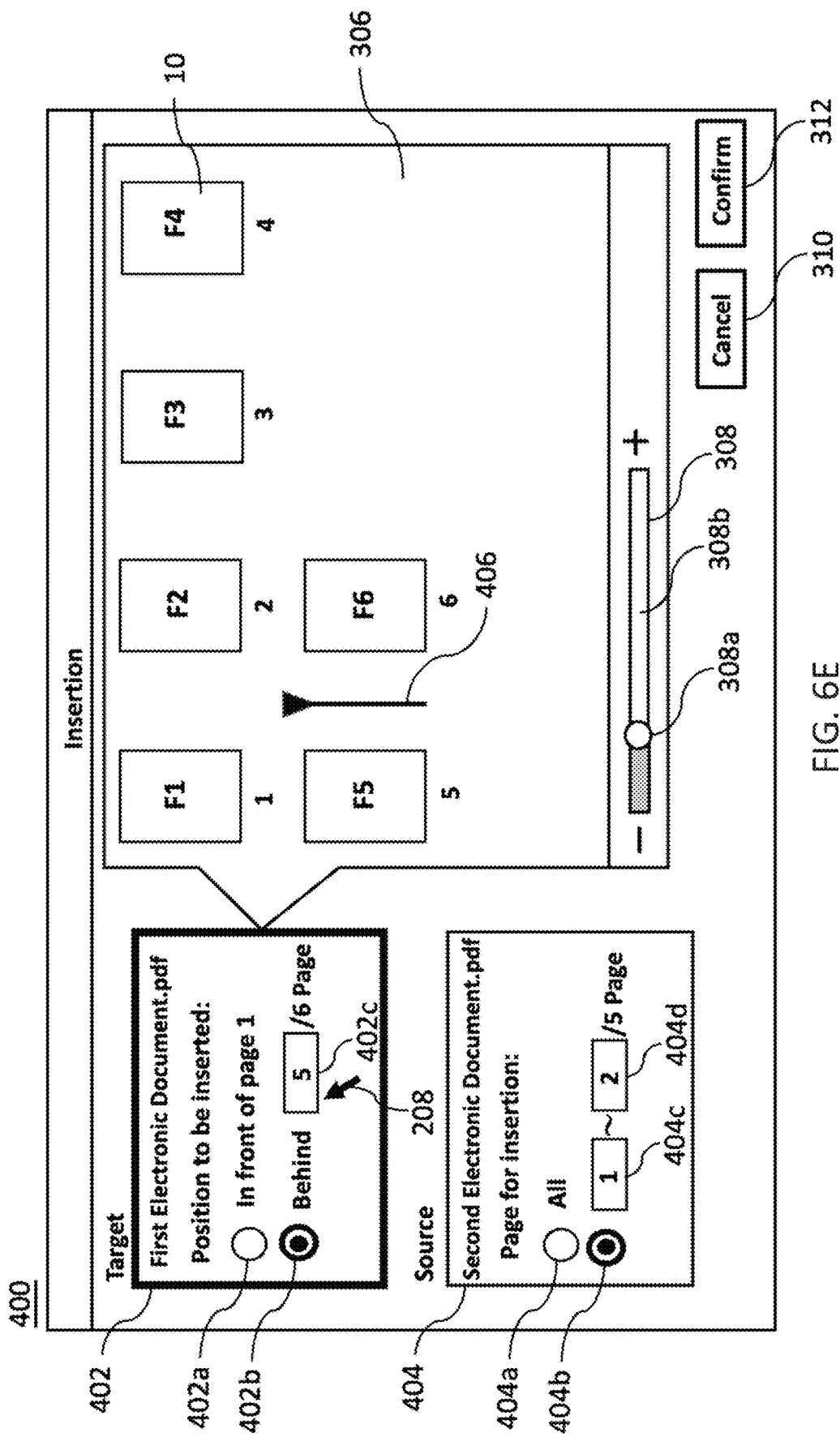

Referring now to FIG. 1, FIG. 6D and FIG. 6E, the processor 102 can drive the display 104 to display the pages F1 to F6 of the first electronic document 10 or the pages S1 to S5 of the second electronic document 20 on the page preview region 306 according to whether the first input region 402 or the second input region 404 is selected. In the second embodiment, the method for modifying pages of an electronic document may further comprise the following step: when the processor 102 detects that the first input region 402 is selected (as shown in FIG. 6E), the processor 102 will drive the display 104 to switch the pages S1-S5 (as shown in FIG. 6D) of the second electronic document 20 displayed on the page preview region 306 to the pages F1-F6 of the first electronic document 10 (as shown in FIG. 6E); and when the processor 102 detects that the second input region 404 is selected (as shown in FIG. 6D), the processor 102 will drive the display 104 to switch the pages F1-F6 of the first electronic document 10 (as shown in FIG. 6E) displayed on the page preview region 306 to the pages S1-S5 of the second electronic document 20 (as shown in FIG. 6D).

In addition, in the second embodiment, the at least one second page can be selected and determined by the selection of the input option 404a of the second input region 404, by the selection of the input option 404b of the second input region 404 in conjunction with a second input of the two input fields 404c, 404d, or by at least one click selection operation or a frame selection operation performed by the cursor 208 with respect to at least one second page of the second electronic document 20 on the page preview region 306. In another embodiment, after the at least one second page is selected and determined by the selection of the input option 404a of the second input region 404 or by the selection of the input option 404b of the second input region 404 in conjunction with a second input of the two input fields 404c, 404d, the at least one second page can be further changed to at least one third page by at least one click selection operation or a frame selection operation performed by the cursor 208 with respect to at least one second page of the second electronic document 20 on the page preview region 306. On the contrary, after the at least one second page is selected and determined by at least one click selection operation or a frame selection operation performed by the cursor 208 with respect to at least one second page of the second electronic document 20 on the page preview region 306, the at least one second page can be further changed to at least one third page by the selection of the input option 404a of the second input region 404 or by the selection of the input option 404b of the second input region 404 in conjunction with a second input of the two input fields 404c, 404d. In the second embodiment and another embodiment, the selection of the at least one second page and the selection of the at least one third page both interact with the second input of the two input fields 404c, 404d.

Similarly, in the second embodiment, the method for modifying pages of an electronic document may further comprise the following step: when the processor 102 detects that the second input region 404 is selected, the processor 102 will adjust the size of the pages S1 to S5 on the page preview region 306 according to a fifth operation event performed with respect to the zoom control element 308. The fifth operation event in the second embodiment is the same as the fifth operation event in the first embodiment, and thus is not described in detail herein.

Figure 6F:
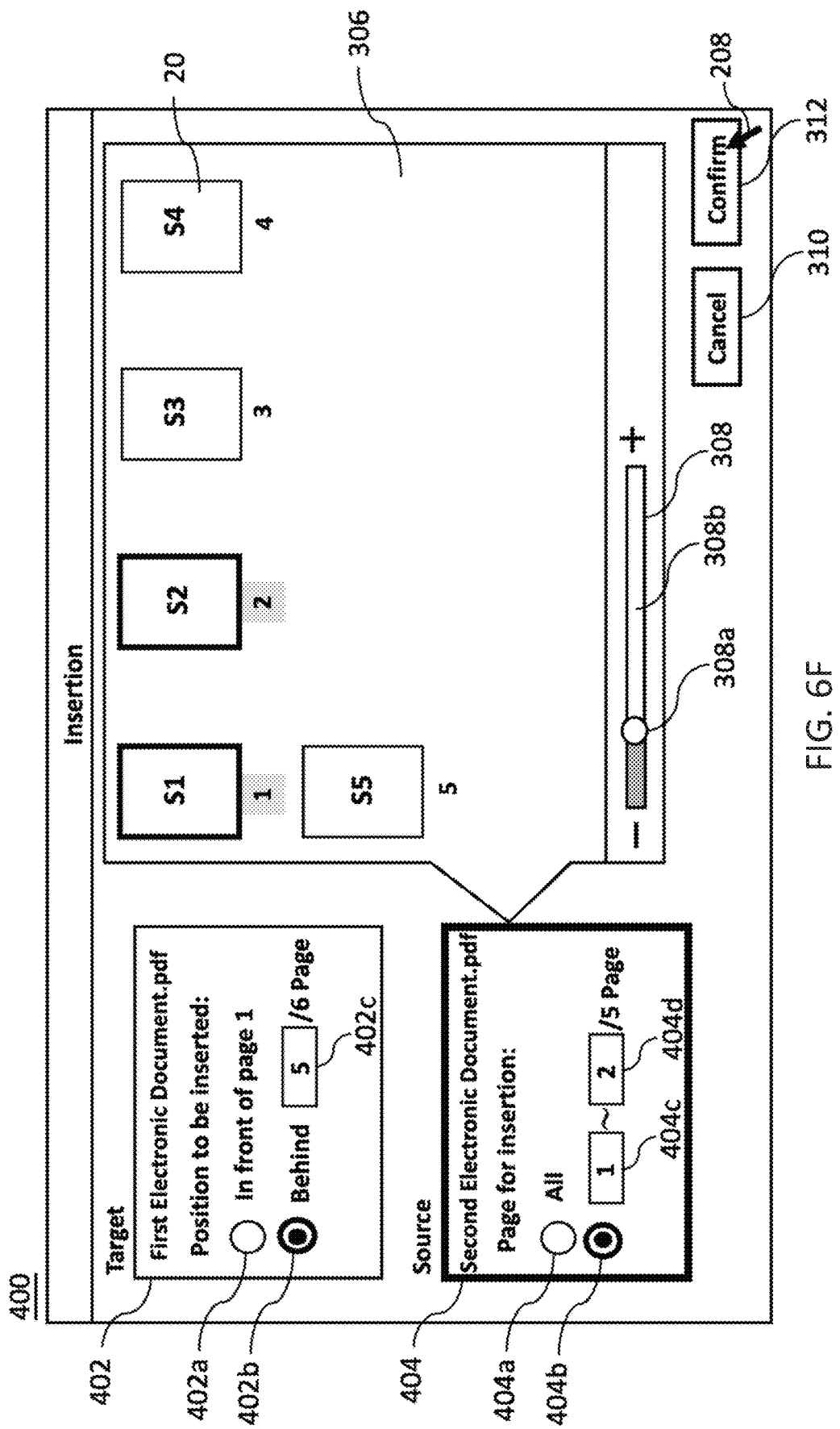
Figure 6G:
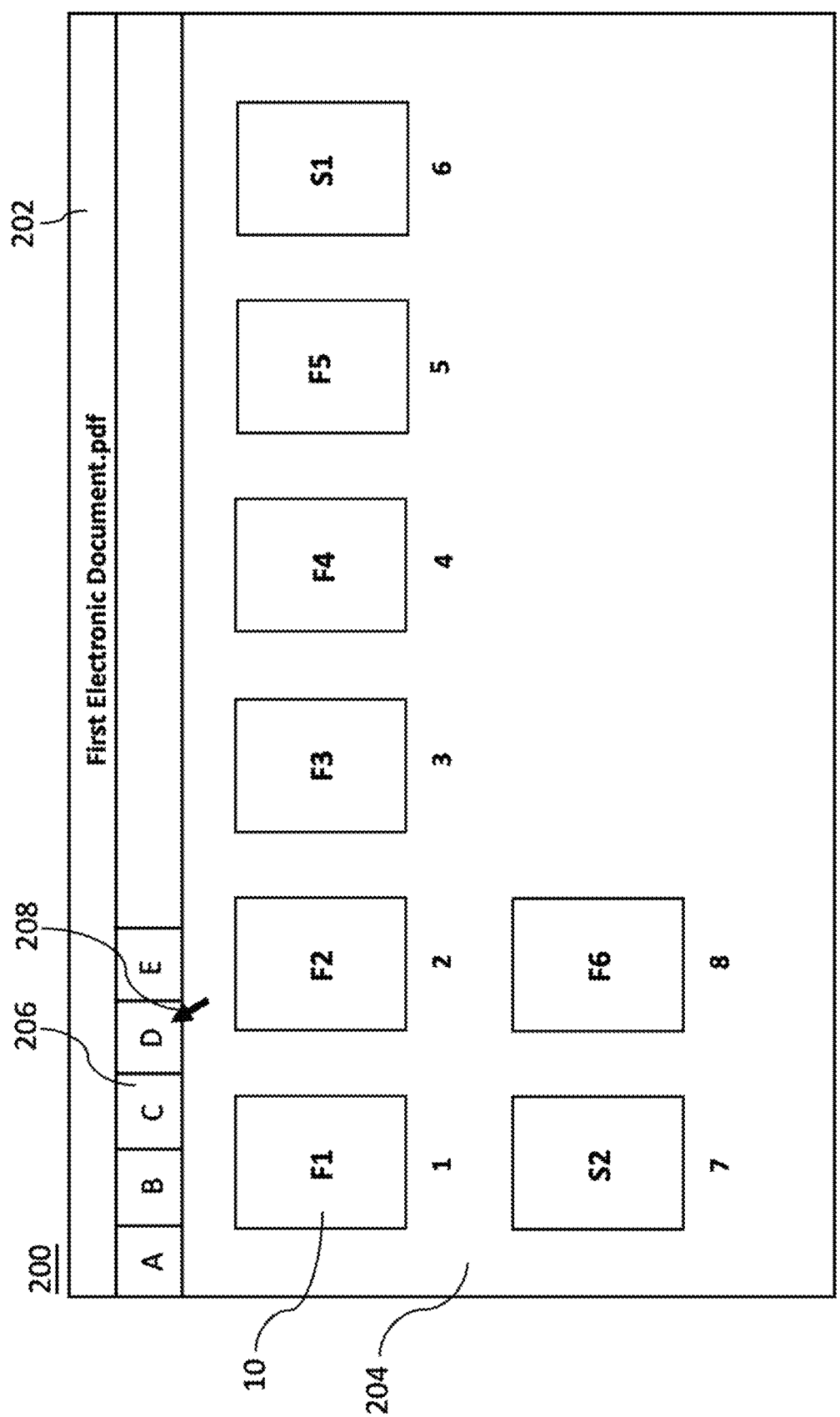

In step S312, after the processor 102 determines a first page change position in the first electronic document 10 and at least one second page in the second electronic document 20, the processor 102 will add the at least one second page to the first page change position according to a third operation event. In the second embodiment, the third operation event may be a click selection operation (as shown in FIG. 6F) performed by the cursor 208 controlled by the first input device 108 with respective to the confirmation button 312, and the step of adding the at least one second page to the first page change position is implemented by the processor 102 inserting the page S1 and the page S2 of the second electronic document 20 to a position behind the page F5 in the first electronic document 10. More specifically, after the cursor 208 controlled by the first input device 108 performs a click selection operation with respect to the confirmation button 312 (as shown in FIG. 6F), the processor 102 will insert the page S1 and the page S2 of the second electronic document 20 to a position behind the page F5 in the first electronic document 10, and close the second user operation interface 400, so as to drive the display 104 to redisplay the document editing interface 200 to present a new first electronic document 10 with the page S1 and the page S2 inserted thereto, as shown in FIG. 6G. In FIG. 6G, the new first electronic document 10 includes the pages F1 to F5, the page S1, the page S2 and the page F6 arranged in order. In the second embodiment, when the cursor 208 controlled by the first input device 108 performs a click selection operation with respect to the function option D (as shown in FIG. 6G), the processor 102 will store the new first electronic document 10 in the storage 106 of the electronic apparatus 100 or in a storage in a remote apparatus.

Figure 7A:
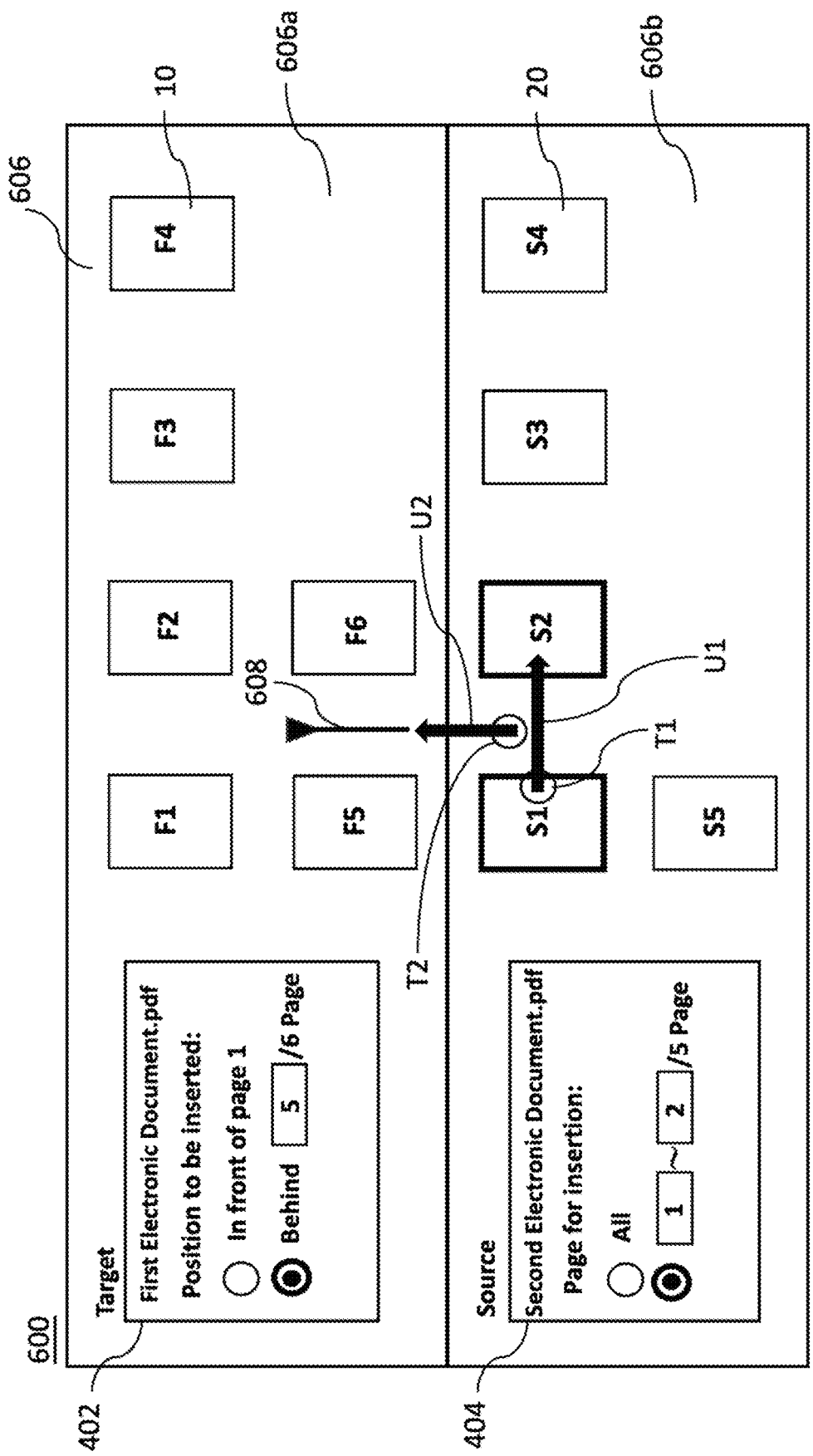
FIG. 7A and FIG. 7B are schematic diagrams of a fourth user operation interface in different operation states according to an embodiment of the present disclosure.
Figure 7B:
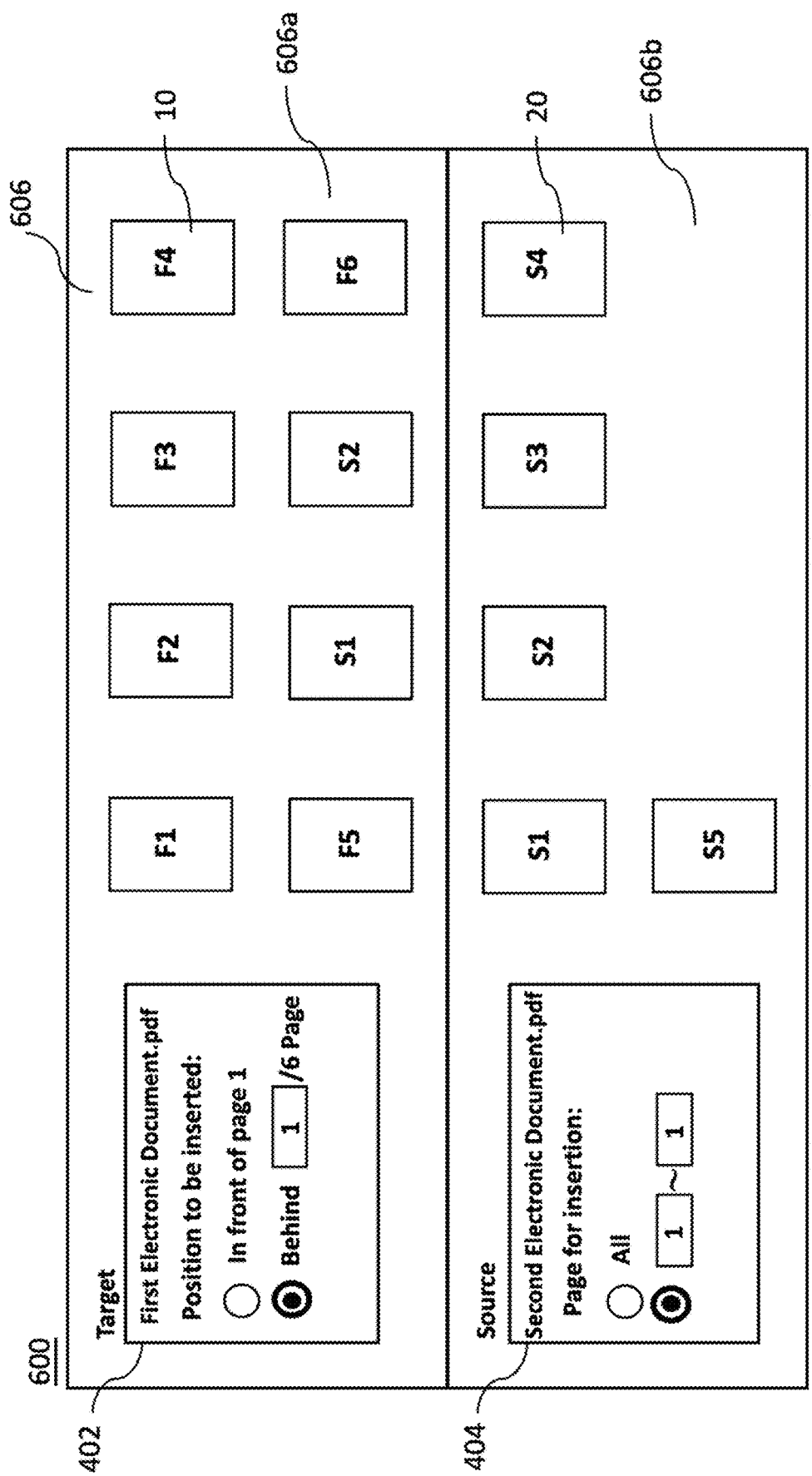

FIG. 7A and FIG. 7B are schematic diagrams of a fourth user operation interface 600 in different operation states according to an embodiment of the present disclosure. In another embodiment, the first input device 108 shown in FIG. 1 is a touch screen integrated in the display 104 for performing an operation on the fourth user operation interface 600. Referring to FIG. 7A, the fourth user operation interface 600 includes a first input region 402, a second input region 404 and a page preview region 606. The page preview region 606 further includes a first preview region 606a and a second preview region 606b. The first preview region 606a is used for displaying a plurality of first pages F1 to F6 of a first electronic document 10, and the second preview region 606b is used for displaying a plurality of second pages S1 to S5 of a second electronic document 20. The interaction between the first input region 402 and the first electronic document 10 and the interaction between the second input region 404 and the second electronic document 20 described in the present embodiment are the same as those described in the second embodiment, and thus is not described in detail herein. In the present embodiment, the pages S1 to S2 of the second electronic document 20 can be selected and determined by at least one touch point or at least one movement of a touch point on the first input device 108 (e.g., a touch screen). For example, the page S1 and the page S2 may be selected and determined by two touch points on the first input device 108, or by a touch point T1 moving along a direction U1 on the first input device 108. After the page S1 and the page S2 are selected and determined, the processor 102 will add the page S1 and the page S2 to a first page change position in the first electronic document according to a third operation event. In the present embodiment, the third operation event may be a dragging operation detected by the first input device 108 with respect to the selected pages S1 and S2, and the dragging operation is implemented by a movement of a touch point T2, which is close to the pages S1 and S2, along a direction U2, for dragging the selected pages S1 and S2 to a first page change position (e.g., a position marked with a insertion icon 608 between the page F5 and the page F6) in the first electronic document 10. When the dragging operation is complete, the page S1 and the page S2 are inserted to a position between the page F5 and the page F6, as shown in FIG. 7B.

It should be understood that, in the method for modifying pages of an electronic document as illustrated in FIG. 3A, the step S304 and the step S306 can be interchanged with the step S308 and the step S310, that is, the step S308 and the step S310 are performed first, and the step S304 and the step S306 are performed afterward, which can also achieve the same purpose of the present disclosure.

Figure 3D:
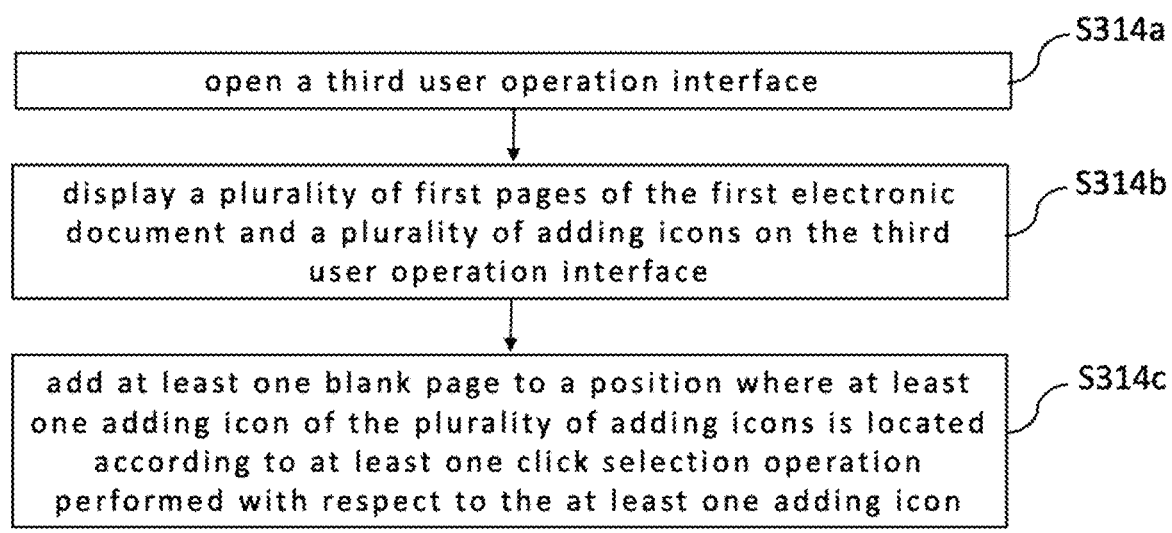

In addition, the method for modifying pages of an electronic document of the present embodiment may further comprise steps S314a, S314b and S314c (as shown in FIG. 3D) for adding at least one blank page to the first electronic document 10.

Figure 8A:
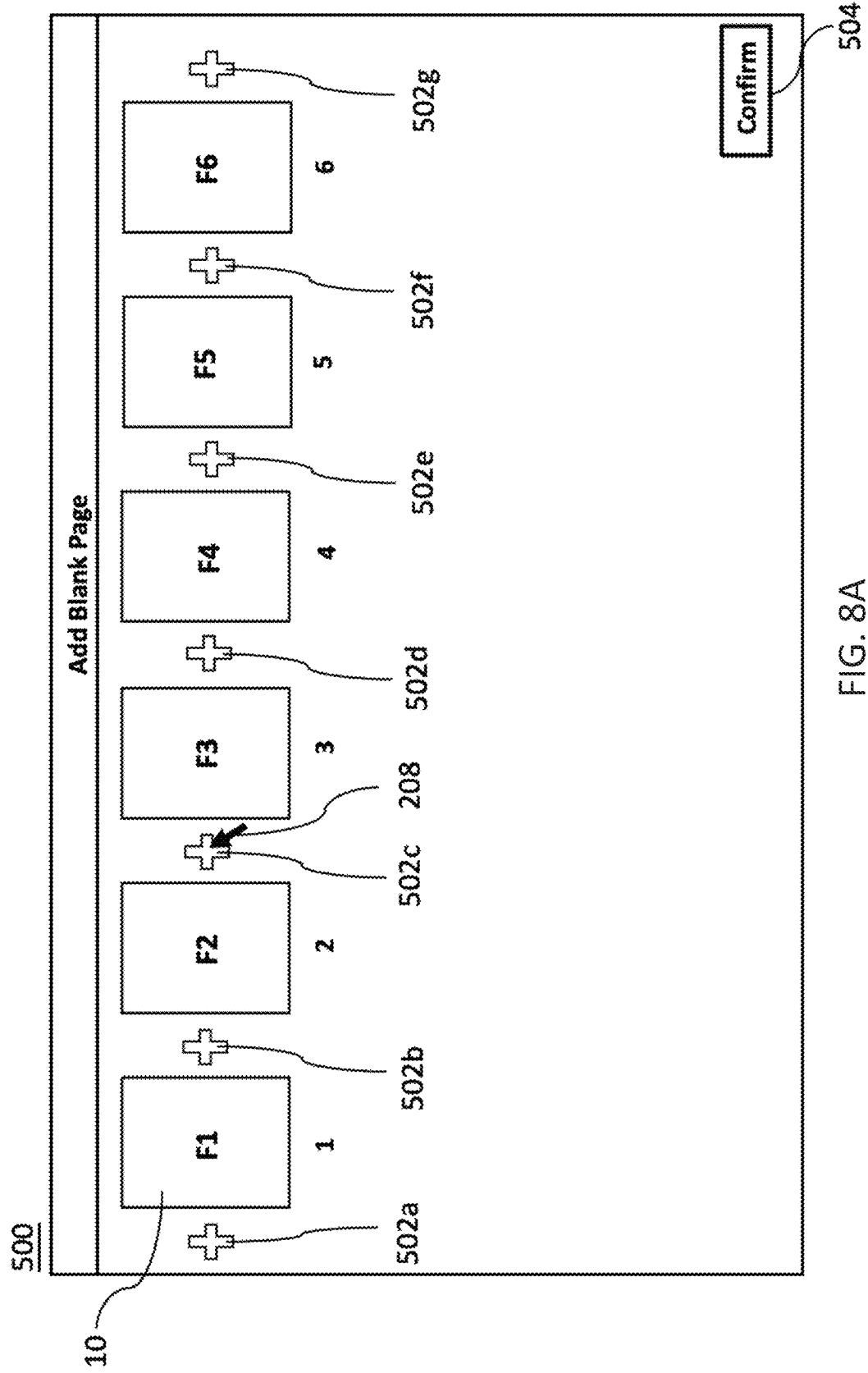
FIG. 8A to FIG. 8C are schematic diagrams of a third user operation interface in different operation states according to an embodiment of the present disclosure.
Figure 8B:
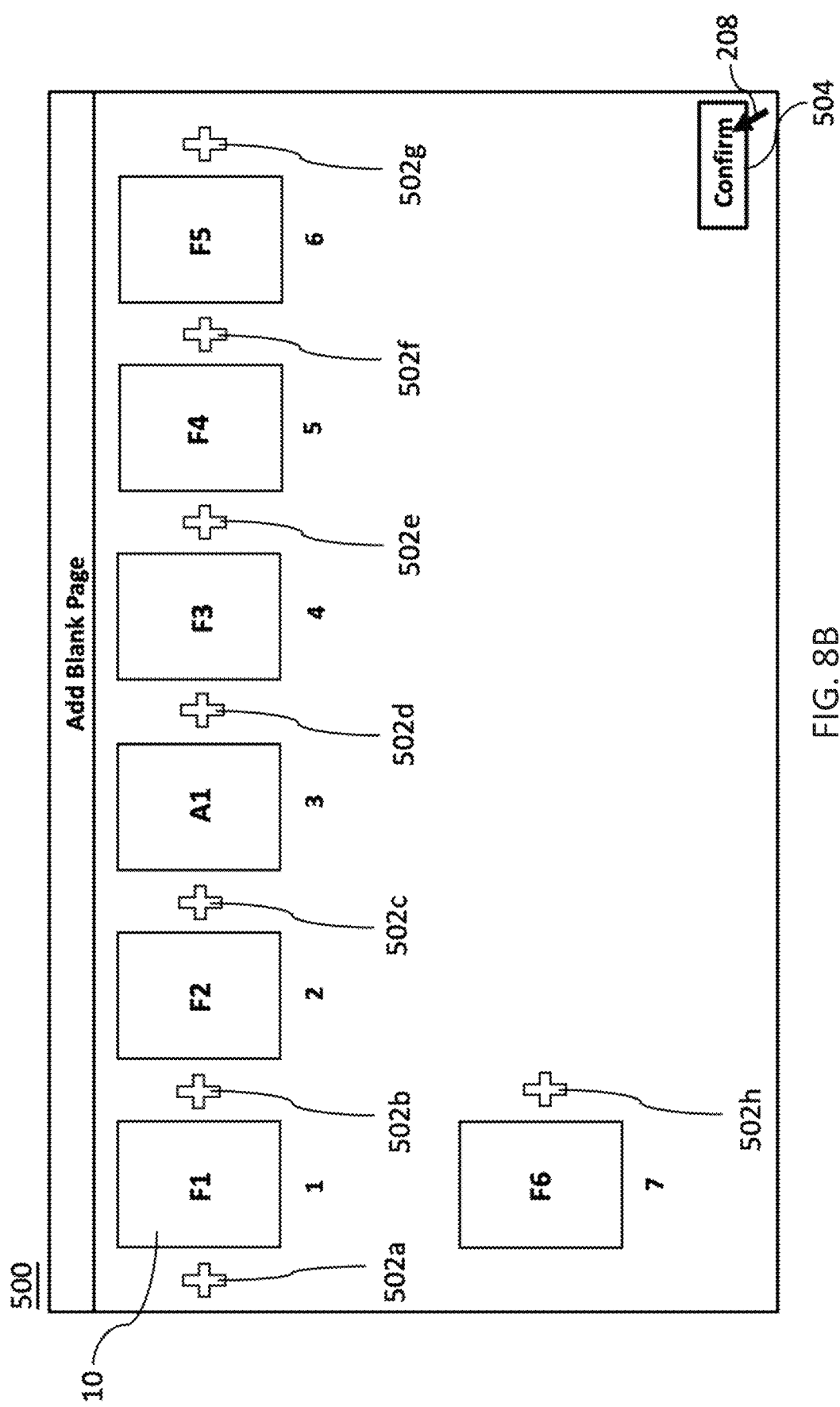
Figure 8C:
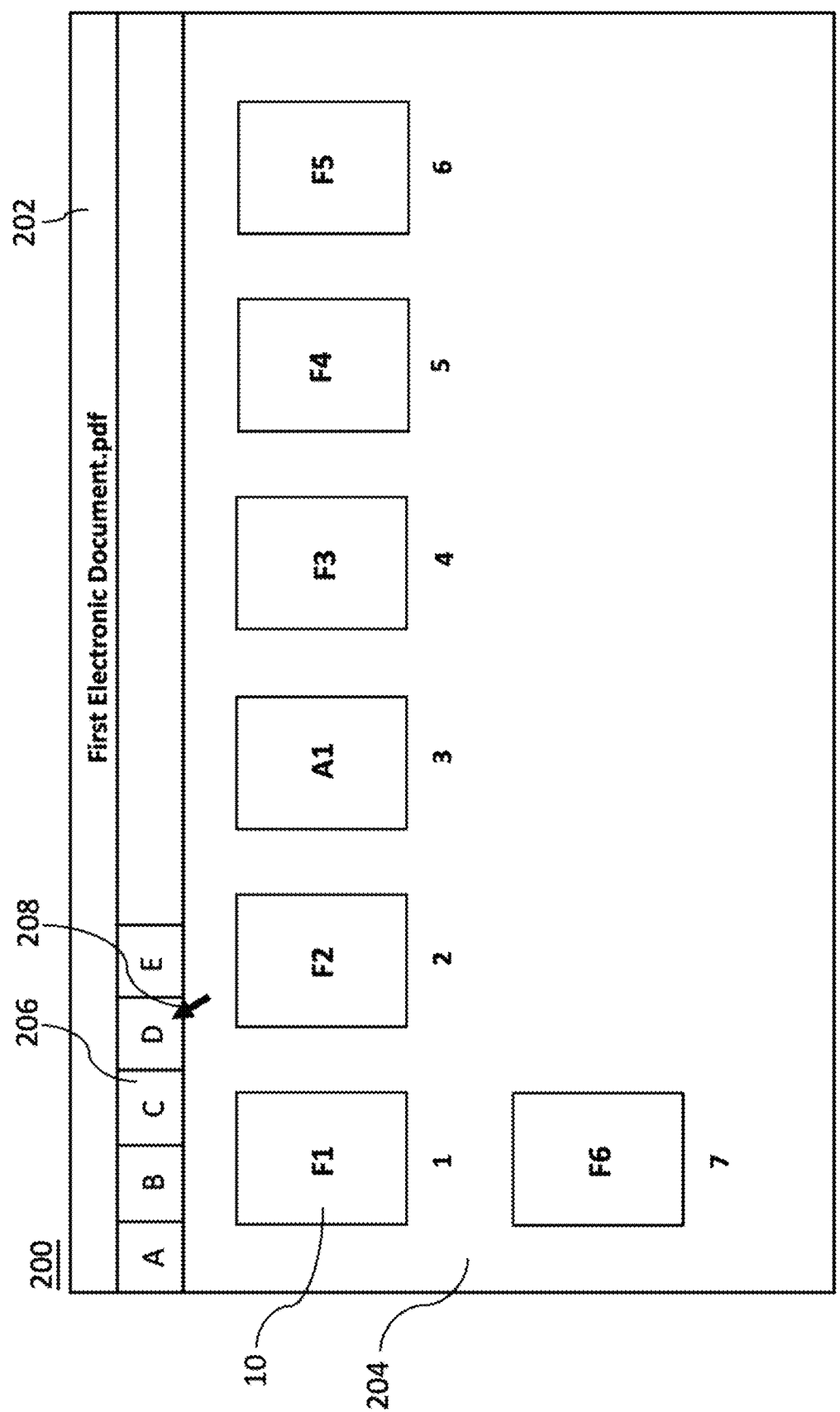

FIG. 8A to FIG. 8C are schematic diagrams of a third user operation interface 500 in different operation states according to an embodiment of the present disclosure. Referring to FIG. 1 and FIG. 4C, after the first electronic document 10 is opened on the document editing region 204 of the document editing interface 200, the first input device 108 can control the cursor 208 and move the cursor 208 from the function option B to the function option E (e.g., add blank page) to trigger the electronic apparatus 100 to perform steps S314a, S314b, S314c, as shown in FIG. 3D.

In step S314a, the processor 102 will open a third user operation interface 500, as shown in FIG. 8A. In the present embodiment, the third user operation interface 500 includes a confirmation button 504.

In step S314b, the processor 102 will drive the display 104 to display a plurality of first pages F1 to F6 of the first electronic document 10 and a plurality of adding icons 502a-502g on the third user operation interface 500. In the present embodiment, the adding icon 502a is located in front of the page F1, each of the adding icons 502b-502f is located between every two adjacent first pages of the plurality of first pages F1 to F6, and the adding icon 502g is located behind the page F6.

In step S314c, the processor 102 will add at least one blank page to at least one position where at least one adding icon of the plurality of adding icons 502a-502g is located according to at least one click selection operation performed with respect to the at least one adding icon. In the present embodiment, the first input device 108 can control the cursor 208 and move the cursor 208 to an adding icon 502c between the page F2 and the page F3 to perform a click selection operation (as shown in FIG. 8A), so that the processor 102 can add a blank page A1 to the position where the adding icon 502c is located (that is, the position between the page F2 and the page F3) according to the click selection operation and then add an adding icon 502h behind the page F6, as shown in FIG. 8B. Then, after the cursor 208 controlled by the first input device 108 performs a click selection operation with respect to the confirmation button 504 (as shown in FIG. 8B), the processor 102 will close the third user operation interface 500, so as to drive the display 104 to redisplay the document editing interface 200 to present a new first electronic document 10 with the page A1 added, as shown in FIG. 8C. In FIG. 8C, the new first electronic document 10 includes the page F1, the page F2, the page A1 and the pages F3 to F6 arranged in order. In the present embodiment, when the cursor 208 controlled by the first input device 108 performs a click selection operation with respect to the function option D (as shown in FIG. 8C), the processor 102 will store the new first electronic document 10 in the storage 106 of the electronic apparatus 100 or in a storage in a remote apparatus.

The present disclosure further provides a non-transitory computer readable medium storing a plurality of computer executable instructions. The plurality of computer executable instructions, when executed by one or more processors, cause an electronic apparatus (e.g., the electronic apparatus 100 shown in FIG. 1) to perform the method for modifying pages of an electronic document in the above embodiment. In an embodiment of the present disclosure, the non-transitory computer readable medium can be, for example, a hard disk, an optical disk, a USB flash, a solid state drive (SSD), etc., but not limited thereto.

Although the present disclosure has been disclosed by way of above embodiments, the embodiments are not intended to limit the present disclosure, and those skilled in the art will appreciate that changes and modifications may be made therein as long as those changes and modifications do not deviate from the spirit and the scope of the present disclosure. Therefore, the scope of the present disclosure should be construed according to the definitions in the appended claims.

What is claimed is:

1. A method for modifying pages of an electronic document, the method being performed by an electronic apparatus and comprising the following steps:
opening a first user operation interface, wherein the first user operation interface includes a first input region, a second input region and a page preview region;
detecting whether the first input region is selected;
when it is detected that the first input region is selected, displaying a plurality of first pages of a first electronic document on the page preview region and determining a first page change position located in the plurality of first pages according to a first operation event;
detecting whether the second input region is selected;
when it is detected that the second input region is selected, displaying a plurality of second pages of a second electronic document on the page preview region and determining at least one second page of the plurality of second pages according to a second operation event; and
adding the at least one second page to the first page change position according to a third operation event.

2. The method of claim 1, wherein the first user operation interface further includes a zoom control element, and the method further comprises:
when it is detected that the first input region is selected, adjusting the size of the plurality of first pages on the page preview region according to a fourth operation event performed with respect to the zoom control element; and
when it is detected that the second input region is selected, adjusting the size of the plurality of second pages on the page preview region according to a fifth operation event performed with respect to the zoom control element.

3. The method of claim 1, further comprising:
when it is detected that the first input region is selected, switching the plurality of second pages of the second electronic document displayed on the page preview region to the plurality of first pages of the first electronic document; and
when it is detected that the second input region is selected, switching the plurality of first pages of the first electronic document displayed on the page preview region to the plurality of second pages of the second electronic document.

4. The method of claim 1, wherein the first page change position is at least one first position where at least one of the plurality of first pages is located in the first electronic document, and the step of adding the at least one second page to the first page change position is implemented by a step of:
replacing the at least one of the plurality of first pages with the at least one second page, wherein the at least one first position is represented by at least one first page number corresponding to the at least one of the plurality of first pages.

5. The method of claim 1, wherein the first page change position is a first position in front of or behind a first page of the plurality of first pages, and the step of adding the at least one second page to the first page change position is implemented by a step of:
inserting the at least one second page to the first position in front of or behind the first page, wherein the first position is represented by a first page number corresponding to the first page of the plurality of first pages.

6. The method of claim 1, wherein:
the first operation event is receiving from the first input region a first input associated with the first page change position, wherein the first input is associated with at least one first page number corresponding to the first page change position;
the step of determining the first page change position located in the plurality of first pages according to the first operation event further comprises:
marking the first page change position located in the plurality of first pages of the first electronic document displayed on the page preview region according to the at least one first page number; and
the method further comprises:
displaying the at least one first page number on the first input region;
selecting a second page change position located in the plurality of first pages of the first electronic document displayed on the page preview region according to a first selection event, wherein the first selection event is a first click selection operation or a first frame selection operation performed with respect to the second page change position; and
changing the at least one first page number displayed on the first input region to at least one second page number associated with the selected second page change position according to the selected second page change position, wherein the selection of the second page change position interacts with the first input.

7. The method of claim 1, wherein:
the second operation event is receiving from the second input region a second input associated with the at least one second page, wherein the second input includes at least one third page number corresponding to the at least one second page;
the step of determining the at least one second page of the plurality of second pages according to the second operation event further comprises:
marking the at least one second page of the plurality of second pages of the second electronic document displayed on the page preview region according to the at least one third page number; and
the method further comprises:
displaying the at least one third page number on the second input region;
selecting at least one third page of the plurality of second pages of the second electronic document displayed on the page preview region according to a second selection event, wherein the second selection event is at least one second click selection operation or a second frame selection operation performed with respect to the at least one third page; and
changing the at least one third page number displayed on the second input region to at least one fourth page number corresponding to the at least one third page according to the at least one third page, wherein the selection of the at least one third page interacts with the second input.

8. The method of claim 1, further comprising:
opening a second user operation interface;
displaying the plurality of first pages of the first electronic document and a plurality of adding icons on the second user operation interface, wherein each adding icon is located between every two adjacent first pages of the plurality of first pages; and
adding at least one blank page to at least one position where at least one adding icon of the plurality of adding icons is located according to at least one click selection operation performed with respect to the at least one adding icon.

9. An electronic apparatus for modifying pages of an electronic document, comprising:
a processor;
a display electrically coupled to the processor; and
a storage electrically coupled to the processor and configured to store a plurality of computer executable instructions, wherein the plurality of computer executable instructions, when executed by the processor, cause the electronic apparatus to perform the following steps:
opening a first user operation interface and displaying the first user operation interface on the display, wherein the first user operation interface includes a first input region, a second input region and a page preview region;
detecting whether the first input region is selected;
when it is detected that the first input region is selected, displaying a plurality of first pages of a first electronic document on the page preview region and determining a first page change position located in the plurality of first pages according to a first operation event;
detecting whether the second input region is selected;
when it is detected that the second input region is selected, displaying a plurality of second pages of a second electronic document on the page preview region and determining at least one second page of the plurality of second pages according to a second operation event; and
adding the at least one second page to the first page change position according to a third operation event.

10. The electronic apparatus of claim 9, wherein the first user operation interface further includes a zoom control element, and the electronic apparatus further performs the following steps:
when it is detected that the first input region is selected, adjusting the size of the plurality of first pages on the page preview region according to a fourth operation event performed with respect to the zoom control element; and
when it is detected that the second input region is selected, adjusting the size of the plurality of second pages on the page preview region according to a fifth operation event performed with respect to the zoom control element.

11. The user apparatus of claim 9, further performing the following steps:
when it is detected that the first input region is selected, switching the plurality of second pages of the second electronic document displayed on the page preview region to the plurality of first pages of the first electronic document; and
when it is detected that the second input region is selected, switching the plurality of first pages of the first electronic document displayed on the page preview region to the plurality of second pages of the second electronic document.

12. The electronic apparatus of claim 9, further comprising at least one input device electrically coupled to the processor, wherein:
the first operation event is receiving from the first input region a first input associated with the first page change position, wherein the first input is inputted by the at least one input device and associated with at least one first page number corresponding to the first page change position;
the step of determining the first page change position located in the plurality of first pages according to the first operation event further comprises:
marking the first page change position located in the plurality of first pages of the first electronic document displayed on the page preview region according to the at least one first page number; and
the electronic apparatus further performs the following steps:
displaying the at least one first page number on the first input region;
selecting a second page change position located in the plurality of first pages of the first electronic document displayed on the page preview region according to a first selection event, wherein the first selection event is a first click operation or a first frame selection operation performed by the at least one input device with respect to the second page change position; and
changing the at least one first page number displayed on the first input region to at least one second page number associated with the selected second page change position according to the selected second page change position, wherein the selection of the second page change position interacts with the first input.

13. The electronic apparatus of claim 9, further comprising at least one input device electrically coupled to the processor, wherein:
the second operation event is receiving from the second input region a second input associated with the at least one second page, wherein the second input is inputted by the at least one input device and includes at least one third page number corresponding to the at least one second page;
the step of determining the at least one second page of the plurality of second pages according to the second operation event further comprises:
marking the at least one second page of the plurality of second pages of the second electronic document displayed on the page preview region according to the at least one third page number; and
the electronic apparatus further performs the following steps:
displaying the at least one third page number on the second input region;
selecting at least one third page of the plurality of second pages of the second electronic document displayed on the page preview region according to a second selection event, wherein the second selection event is at least one second click selection operation or a second frame selection operation performed by the at least one input device with respect to the at least one third page; and
changing the at least one third page number displayed on the second input region to at least one fourth page number corresponding to the at least one third page according to the at least one third page, wherein the selection of the at least one third page interacts with the second input.

14. The electronic apparatus of claim 9, further comprising at least one input device electrically coupled to the processor, wherein:
the first user operation interface further includes a confirmation button; and
the third operation event is a click selection operation performed by the at least one input device with respect to the confirmation button.

15. The electronic apparatus of claim 9, further comprising at least one input device electrically coupled to the processor, wherein:
the page preview region further includes a first preview region and a second preview region;
the first preview region is used for displaying the plurality of first pages of the first electronic document;
the second preview region is used for displaying the plurality of second pages of the second electronic document; and
the third operation event is a dragging operation detected by the at least one input device with respect to the at least one second page for dragging the at least one second page to the first page change position.

16. A non-transitory computer readable medium storing a plurality of computer executable instructions, wherein the plurality of computer executable instructions, when executed by one or more processors, cause an electronic apparatus to perform a method for modifying pages of an electronic document, and the method comprises the following steps:

opening a first user operation interface, wherein the first user operation interface includes a first input region, a second input region and a page preview region;
detecting whether the first input region is selected;
when it is detected that the first input region is selected, displaying a plurality of first pages of a first electronic document on the page preview region and determining a first page change position located in the plurality of first pages according to a first operation event;
detecting whether the second input region is selected;
when it is detected that the second input region is selected, displaying a plurality of second pages of a second electronic document on the page preview region and determining at least one second page of the plurality of second pages according to a second operation event; and
adding the at least one second page to the first page change position according to a third operation event.

17. The non-transitory computer readable medium of claim 16, wherein the first user operation interface further includes a zoom control element, and the method further comprises:
when it is detected that the first input region is selected, adjusting the size of the plurality of first pages on the page preview region according to a fourth operation event performed with respect to the zoom control element; and
when it is detected that the second input region is selected, adjusting the size of the plurality of second pages on the page preview region according to a fifth operation event performed with respect to the zoom control element.

18. The non-transitory computer readable medium of claim 16, wherein the method further comprises:
when it is detected that the first input region is selected, switching the plurality of second pages of the second electronic document displayed on the page preview region to the plurality of first pages of the first electronic document; and
when it is detected that the second input region is selected, switching the plurality of first pages of the first electronic document displayed on the page preview region to the plurality of second pages of the second electronic document.

19. The non-transitory computer readable medium of claim 16, wherein:
the first operation event is receiving from the first input region a first input associated with the first page change position, wherein the first input is associated with at least one first page number corresponding to the first page change position;
the step of determining the first page change position located in the plurality of first pages according to the first operation event further comprises:
marking the first page change position located in the plurality of first pages of the first electronic document displayed on the page preview region according to the at least one first page number; and
the method further comprises:
displaying the at least one first page number on the first input region;
selecting a second page change position located in the plurality of first pages of the first electronic document displayed on the page preview region according to a first selection event, wherein the first selection event is a first click selection operation or a first frame selection operation performed with respect to the second page change position; and changing the at least one first page number displayed on the first input region to at least one second page number associated with the selected second page change position according to the selected second page change position, wherein the selection of the second page change position interacts with the first input.

20. The non-transitory computer readable medium of claim 16, wherein:

the second operation event is receiving from the second input region a second input associated with the at least one second page, wherein the second input includes at least one third page number corresponding to the at least one second page;

the step of determining the at least one second page of the plurality of second pages according to the second operation event further comprises:

marking the at least one second page of the plurality of second pages of the second electronic document displayed on the page preview region according to the at least one third page number; and the method further comprises:

displaying the at least one third page number on the second input region;

selecting at least one third page of the plurality of second pages of the second electronic document displayed on the page preview region according to a second selection event, wherein the second selection event is at least one second click selection operation or a second frame selection operation performed with respect to the at least one third page; and changing the at least one third page number displayed on the second input region to at least one fourth page number corresponding to the at least one third page according to the at least one third page, wherein the selection of the at least one third page interacts with the second input.

* * * * *